(12) United States Patent
D'Agostini

(10) Patent No.: US 12,410,914 B2
(45) Date of Patent: Sep. 9, 2025

(54) SYSTEM AND METHOD FOR COMBUSTING HIGH-MOISTURE FUEL TO GENERATE STEAM

(71) Applicant: Air Products and Chemicals, Inc., Allentown, PA (US)

(72) Inventor: Mark Daniel D'Agostini, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 16/991,633

(22) Filed: Aug. 12, 2020

(65) Prior Publication Data
US 2022/0049848 A1  Feb. 17, 2022

(51) Int. Cl.
  *F23K 1/04*  (2006.01)
  *F23J 15/00*  (2006.01)
  *F23L 7/00*  (2006.01)

(52) U.S. Cl.
  CPC .............. *F23K 1/04* (2013.01); *F23J 15/006* (2013.01); *F23L 7/007* (2013.01); *F23K 2201/20* (2013.01)

(58) Field of Classification Search
  None
  See application file for complete search history.

(56) References Cited

U.S. PATENT DOCUMENTS

| | | | |
|---|---|---|---|
| 3,888,194 A * | 6/1975 | Kishigami | F23G 5/30 |
| | | | 588/408 |
| 4,592,293 A | 6/1986 | Toyama et al. | |
| 5,107,777 A | 4/1992 | Mullen | |
| 5,327,717 A | 7/1994 | Hauk | |
| 7,261,046 B1 * | 8/2007 | Rettig | F23K 1/00 |
| | | | 110/345 |
| 2006/0075682 A1* | 4/2006 | Bullinger | F26B 3/084 |
| | | | 44/626 |
| 2006/0144059 A1* | 7/2006 | Kang | F25B 49/005 |
| | | | 62/208 |
| 2009/0178338 A1* | 7/2009 | Leininger | F23G 5/02 |
| | | | 48/86 R |
| 2010/0154296 A1* | 6/2010 | Malhotra | C10L 5/14 |
| | | | 44/589 |
| 2011/0030235 A1 | 2/2011 | Brancuzsky et al. | |

(Continued)

FOREIGN PATENT DOCUMENTS

| | | |
|---|---|---|
| DE | 3835428 | 4/1990 |
| EP | 2402657 | 1/2012 |
| WO | 2017164990 | 9/2017 |

*Primary Examiner* — Jason Lau
(74) *Attorney, Agent, or Firm* — Jason M. Ploeger

(57) ABSTRACT

A process for combusting a high-moisture fuel to generate steam in which the high-moisture solid fuel is first dried by contacting with an oxygen-depleted gas stream while being heated by indirect heat exchange with a recirculating thermal fluid. The dried fuel is then combusted with a combustion air stream to produce a combustion products stream whose heat first is used to generate steam, and then to preheat the combustion air stream by indirect heat exchange in which a portion of the combustion air stream and/or a portion of the combustion products stream bypasses the heat exchanger. The combustion products stream also provides heat to dry the solid fuel via the recirculating thermal fluid.

5 Claims, 21 Drawing Sheets

(56) References Cited

U.S. PATENT DOCUMENTS

| | | | |
|---|---|---|---|
| 2011/0083594 A1* | 4/2011 | Terushita | F23C 9/00 110/347 |
| 2013/0087085 A1* | 4/2013 | Rugg | F23G 5/04 110/255 |
| 2016/0265845 A1* | 9/2016 | Honjo | C10L 9/083 |
| 2017/0089640 A1* | 3/2017 | Nakata | F26B 3/02 |

* cited by examiner

SYSTEM AND METHOD FOR COMBUSTING HIGH-MOISTURE FUEL TO GENERATE STEAM

BACKGROUND

The present invention provides systems and methods for drying and combusting a high-moisture fuel in order to generate steam, as well as systems and methods for improving the combustion of a low-BTU fuel by oxygen enrichment of the combustion air stream.

The efficient use of biomass, low-rank coal and other solid fuels in reaction vessels such as steam generating boilers, process heating/melting furnaces and gasifiers is often limited by the high moisture content of the fuel. In boilers, high fuel moisture levels suppress the flame temperature leading to reduced boiler radiant heat transfer rate, poor fuel utilization (high unburned carbon levels) and, ultimately, to steam generation capacity that is below design expectations. Moreover, high fuel moisture leads to extremely large flue gas volume flows and low boiler efficiency due to loss of latent heat in the exhaust gases leaving the stack.

Combustion can be made more efficient via the direct or indirect injection of a gas having an oxygen concentration higher than the 20.9% in ambient air. The primary benefits include increasing both the flame temperature (leading to higher rates of radiation heat transfer) and the rate of combustion kinetics (further leading to higher combustion efficiency), as well as reducing the flow rate of combustion air required, leading to lower flow rate of the products of combustion. For a given sized of boiler, this enables higher fuel throughput and steam and/or power generation.

Mullen (U.S. Pat. No. 5,107,777) teaches a method to improve the combustion of fuels with a high moisture content by using oxygen enrichment.

Braneuzsky et al. (US 2011/0030235) teach a method for drying bulk goods such as wood chips in an inert environment by using oxygen-depleted exhaust gas to improve safety and reduce emissions.

Hauk (U.S. Pat. No. 5,327,717) teaches a method for drying a high-moisture coal to supply a coal gasifier that uses nitrogen to inert the dryer and hot water under pressure to provide heat by indirect heat exchange.

A cost-effective, safe and technically sound means of reducing fuel moisture is therefore needed to improve boiler efficiency and increase steam generation rate, thereby dramatically reducing the cost of steam generation and electric power production. Since fuel moisture levels are subject to change with seasonal ambient conditions and changes in fuel supply, the system should offer broad operational flexibility to enable optimization as circumstances vary.

SUMMARY

This invention relates to a process to generate steam from a high-moisture, low-BTU solid fuel. The process thermally integrates a dryer with a boiler where the combustion products stream leaving the boiler provides process heat in the form of a recirculating thermal fluid to dry the wet fuel while an inert atmosphere ensures safe operation of the dryer. Efficiency may be further improved by oxygen enrichment on the combustion air used in the boiler. The degree of oxygen enrichment may be used to control the operation of the steam generator.

Aspect 1: A process for combusting a high-moisture fuel to generate steam, the process comprising contacting a high-moisture solid fuel with an oxygen-depleted gas stream while heating the high-moisture solid fuel by indirect heat exchange with a recirculating thermal fluid to produce a dried solid fuel and a moist oxygen-depleted gas stream; combusting the dried solid fuel with a combustion air stream to produce a combustion products stream having an amount of heat; transferring a first portion of the amount of heat to generate steam by indirect heat exchange with the combustion products stream; transferring a second portion of the amount of heat to preheat the combustion air by indirect heat exchange with the combustion products stream; transferring a third portion of the amount of heat to the recirculating thermal fluid by indirect heat exchange with the combustion products stream; and bypassing one or both of a portion of the combustion air stream to avoid the indirect heat exchange with the combustion products stream and a portion of the combustion products stream to avoid the indirect heat exchange with the combustion air stream.

Aspect 2: A process according to Aspect 1, wherein the high-moisture solid fuel flows counter-current to the recirculating thermal fluid and co-current to the oxygen-depleted gas stream.

Aspect 3: A process according to Aspect 1 or Aspect 2, wherein the temperature of the moist oxygen-depleted gas stream is greater than 80° C.

Aspect 4: A process according to any of Aspects 1 to 3, further comprising adding an oxygen-enriched stream to the combustion air stream prior to combusting the dried solid fuel; and controlling one or both of a flow rate of the oxygen-enriched stream and a location of adding the oxygen-enriched stream to control one or more of the following properties: steam temperature, steam pressure, steam drum level, stoker grate temperature, temperature of the combustion products stream prior to transferring the first portion of the amount of heat to generate steam, temperature of the combustion products stream after transferring the first portion of the amount of heat to generate steam, temperature of the combustion products stream after transferring the second portion of the amount of heat the preheat the combustion air, temperature of the combustion products stream after transferring the third portion of the amount of heat to the recirculating thermal fluid, temperature of the moist oxygen-depleted gas stream, temperature of the dried solid fuel, moisture level of the high-moisture solid fuel, and moisture level of the dried solid fuel.

Aspect 5: A process according to Aspect 4, wherein the oxygen-enriched stream and the oxygen-depleted stream are both produced by the same air separation unit.

Aspect 6: A process according to any of Aspects 1 to 5, wherein when bypassing a portion of the combustion air stream, increasing or decreasing the amount of the portion of the combustion air stream bypassing indirect heat exchange with the combustion products stream to control one or more of the following properties: temperature of the combustion products stream prior to transferring the second portion of the amount of heat to the recirculating thermal fluid, temperature of the combustion products stream after transferring the second portion of the amount of heat to the recirculating thermal fluid, moisture content of the dried solid fuel, or moisture content of the oxygen-depleted gas stream after contacting with the high-moisture solid fuel; and wherein when bypassing a portion of the combustion products stream, increasing or decreasing the amount of the portion of the combustion products stream bypassing indirect heat exchange with the combustion air stream to control one or more of the following properties: temperature of the combustion product stream prior to transferring the second portion of the amount of heat to the recirculating thermal fluid, temperature of the combustion product stream after transferring the second portion of the amount of heat to the recirculating thermal fluid, moisture content of the dried solid fuel, or moisture content of the oxygen-depleted stream after contacting with the high-moisture solid fuel.

Aspect 7: An apparatus for generating steam comprising a dryer configured and arranged to create contact between a high-moisture solid fuel and an oxygen-depleted gas stream and to produce a dried solid fuel; a combustion air system having an air inlet for receiving air and a combustion air outlet for discharging the combustion air stream; a boiler comprising a radiant section, a convective section, and an energy recovery section, the radiant section being configured and arranged to receive the dried solid fuel from the dryer and the combustion air stream from the combustion air system, and to combust the dried solid fuel with a combustion air stream to produce a combustion products stream and an amount of heat, the radiant section having a first port to introduce at least a portion of the combustion air stream below a feed location of the dried solid fuel, the convective section having an auxiliary heat exchanger in fluid flow communication with the radiant section for heating water by indirect heat exchange with the combustion products stream to produce steam, and the energy recovery section including an air preheater for preheating the combustion air stream by indirect heat exchange with the combustion products stream, and an auxiliary heat exchanger for heating a first heat transfer fluid, one or both of a combustion air bypass conduit including a combustion air bypass control valve to enable controlled diversion of a portion of the combustion air stream around the air preheater and a combustion products bypass conduit including a combustion products bypass valve to enable controlled diversion of a portion of the combustion product stream around the air preheater.

Aspect 8: An apparatus according to Aspect 7, the dryer having an inlet section and an outlet section, the inlet section including a high-moisture solid fuel inlet, an oxygen-depleted stream inlet, and a recirculating thermal fluid outlet; the outlet section including a high-moisture solid fuel outlet, an oxygen-depleted stream outlet, and a recirculating thermal fluid inlet.

Aspect 9: An apparatus according to Aspect 7 or Aspect 8, the combustion air system further having an oxygen inlet for receiving oxygen and one or more oxygen control valves to enable controlled oxygen enrichment of the combustion air stream upstream of the combustion air outlet.

Aspect 10: An apparatus according to Aspect 9, further comprising one or more sensors each configured and arranged to provide a signal indicative of a process variable selected from: steam temperature, steam pressure, moisture at the high-moisture solid fuel inlet, moisture at the high-moisture solid fuel outlet, and moisture at the oxygen-depleted stream outlet; and an oxygen control loop programmed to control the one or more oxygen control valves to increase or decrease the oxygen enrichment of the combustion air stream based on the signal of the one or more of the sensors.

Aspect 11: An apparatus according to any of Aspects 7 to 10, further comprising one or more sensors each configured and arranged to provide a signal indicative of a process variable selected from: moisture at the high-moisture solid fuel outlet, moisture at the oxygen-depleted stream outlet, temperature sensor of the combustion products stream in the radiant section, and temperature of the combustion products stream in the convective section; and when the apparatus includes a combustion air bypass conduit, a combustion air bypass control loop programmed to control the combustion air bypass control valve to increase or decrease the portion of the combustion air stream bypassing indirect heat exchange with the combustion products stream based on the signal from one or more of the sensors, and when the apparatus includes a combustion products bypass conduit, a combustion products bypass control loop programmed to control the combustion products bypass control valve to increase or decrease the portion of the combustion products stream bypassing indirect heat exchange with the combustion air stream based on the signal from one or more of the sensors.

Aspect 12: An apparatus according to any of Aspects 7 to 11, the radiant section further having a second port to introduce at least a portion of the combustion air stream above the feed location of the dried solid fuel.

Aspect 13: A process for combusting a high-moisture fuel to generate steam, the process comprising contacting a high-moisture solid fuel with a heated inert gas stream to produce a dried solid fuel and a moist inert gas stream; combusting the dried solid fuel with a combustion air stream to produce a combustion products stream having an amount of heat; transferring a first portion of the amount of heat to generate steam by indirect heat exchange with the combustion products stream; transferring a second portion of the amount of heat to preheat the combustion air by indirect heat exchange with the combustion products stream; transferring a third portion of the amount of heat to an inert gas stream by indirect heat exchange with the combustion products stream to produce the heated inert gas stream; and bypassing one or both of a portion of the combustion air stream to avoid the indirect heat exchange with the combustion products stream and a portion of the combustion products stream to avoid the indirect heat exchange with the combustion air stream.

Aspect 14: A process according to Aspect 13, wherein the high-moisture solid fuel flows counter-current to the heated inert gas stream.

Aspect 15: A process according to Aspect 13 or Aspect 14, wherein the temperature of the moist inert gas stream is greater than 80° C.

Aspect 16: A process according to any of Aspects 13 to 15, further comprising removing particulates and water from the moist inert gas stream to produce the inert gas stream.

Aspect 17: A process according to Aspect 16, further comprising increasing the pressure of the inert gas stream prior to transferring the third portion of the heat amount to the inert gas stream.

Aspect 18: A process according to any of Aspects 13 to 17, further comprising adding an oxygen-enriched stream to the combustion air stream prior to combusting the dried solid fuel; and controlling one or both of a flow rate of the oxygen-enriched stream and a location of adding the oxygen-enriched stream to control one or more of the following properties: steam temperature, steam pressure, steam drum level, stoker grate temperature, temperature of the combustion products stream prior to transferring the first portion of the amount of heat to generate steam, temperature of the combustion products stream after transferring the second portion of the amount of heat the preheat the combustion air, temperature of the combustion products stream after transferring the third portion of the amount of heat to the recirculating thermal fluid, temperature of the moist oxygen-depleted gas stream, temperature of the dried solid fuel, moisture level of the high-moisture solid fuel, and moisture level of the dried solid fuel.

Aspect 19: A process according to Aspect 18, wherein the oxygen-enriched stream and the inert gas stream are both produced by the same air separation unit.

Aspect 20: A process according to any of Aspects 13 to 19, wherein when bypassing a portion of the combustion air stream, increasing or decreasing the amount of the portion of the combustion air stream bypassing indirect heat exchange with the combustion products stream to control one or more of the following properties: temperature of the combustion products stream prior to transferring the third portion of the amount of heat to the recirculating thermal fluid, temperature of the combustion products stream after transferring the third portion of the amount of heat to the inert gas stream, moisture content of the dried solid fuel, or moisture content of the inert gas stream after contacting with the high-moisture solid fuel; and wherein when bypassing a portion of the combustion products stream, increasing or decreasing the amount of the portion of the combustion products stream bypassing indirect heat exchange with the combustion air stream to control one or more of the following properties: temperature of the combustion product stream prior to transferring the third portion of the amount of heat to the inert gas stream, temperature of the combustion product stream after transferring the third portion of the amount of heat to the inert gas stream, moisture content of the dried solid fuel, or moisture content of the inert gas stream after contacting with the high-moisture solid fuel.

Aspect 21: An apparatus for generating steam comprising a dryer configured and arranged to create contact between a high-moisture solid fuel and a heated inert gas stream and to produce a dried solid fuel; a combustion air system having an air inlet for receiving air and a combustion air outlet for discharging the combustion air stream; a boiler comprising a radiant section, a convective section, and an energy recovery section, the radiant section being configured and arranged to receive the dried solid fuel from the dryer and the combustion air stream from the combustion air system, and to combust the dried solid fuel with a combustion air stream to produce a combustion products stream and an amount of heat, the radiant section having a first port to introduce at least a portion of the combustion air stream below a feed location of the dried solid fuel, the convective section having an auxiliary heat exchanger in fluid flow communication with the radiant section for heating water by indirect heat exchange with the combustion products stream to produce steam, and the energy recovery section including an air preheater for preheating the combustion air stream by indirect heat exchange with the combustion products stream; an auxiliary heat exchanger for heating an inert gas stream to produce the heated inert gas stream; and one or both of a combustion air bypass conduit including a combustion air bypass control valve to enable controlled diversion of a portion of the combustion air stream around the air preheater and a combustion products bypass conduit including a combustion products bypass valve to enable controlled diversion of a portion of the combustion product stream around the air preheater.

Aspect 22: An apparatus according to Aspect 21, the dryer having an inlet section and an outlet section, the inlet section including a high-moisture solid fuel inlet and a moist inert gas stream outlet; the outlet section including a high-moisture solid fuel outlet, and a heated inert gas inlet.

Aspect 23: An apparatus according to Aspect 21 or Aspect 23, the combustion air system further having an oxygen inlet for receiving oxygen and one or more oxygen control valves to enable controlled oxygen enrichment of the combustion air stream upstream of the combustion air outlet.

Aspect 24: An apparatus according to Aspect 23, further comprising one or more sensors each configured and arranged to provide a signal indicative of a process variable selected from: steam temperature, steam pressure, moisture at the high-moisture solid fuel inlet, moisture at the high-moisture solid fuel outlet, and moisture at the inert gas stream outlet; and an oxygen control loop programmed to control the one or more oxygen control valves to increase or decrease the oxygen enrichment of the combustion air stream based on the signal of the one or more of the sensors.

Aspect 25: An apparatus according to any of Aspects 21 to 24, further comprising one or more sensors each configured and arranged to provide a signal indicative of a process variable selected from: moisture at the high-moisture solid fuel outlet, moisture at the inert gas stream outlet, temperature sensor of the combustion products stream in the radiant section, and temperature of the combustion products stream in the convective section; and when the apparatus includes a combustion air bypass conduit, a combustion air bypass control loop programmed to control the combustion air bypass control valve to increase or decrease the portion of the combustion air stream bypassing indirect heat exchange with the combustion products stream based on the signal from one or more of the sensors, and when the apparatus includes a combustion products bypass conduit, a combustion products bypass control loop programmed to control the combustion products bypass control valve to increase or decrease the portion of the combustion products stream bypassing indirect heat exchange with the combustion air stream based on the signal from one or more of the sensors.

Aspect 26: An apparatus according to any of Aspects 21 to 25, the radiant section further having a second port to introduce at least a portion of the combustion air stream above the feed location of the dried solid fuel.

Aspect 27: A process for combusting a high-moisture fuel to generate steam, the process comprising contacting a high-moisture solid fuel with a heated inert gas stream to produce a dried solid fuel and a moist inert gas stream; combusting the dried solid fuel with a combustion air stream to produce a combustion products stream having an amount of heat; transferring a first portion of the amount of heat to generate steam by indirect heat exchange with the combustion products stream; transferring a second portion of the amount of heat to preheat the combustion air by indirect heat exchange with the combustion products stream; transferring a third portion of the amount of heat to a recirculating thermal fluid by indirect heat exchange with the combustion products stream; heating an inert gas stream by indirect heat exchange with the recirculating fluid to produce the heated inert gas stream; and bypassing one or both of a portion of the combustion air stream to avoid the indirect heat exchange with the combustion products stream and a portion of the combustion products stream to avoid the indirect heat exchange with the combustion air stream.

Aspect 28: A process according to Aspect 27, wherein the high-moisture solid fuel flows counter-current to the heated inert gas stream.

Aspect 29: A process according to Aspect 27 or Aspect 28, wherein the temperature of the moist inert gas stream is greater than 80° C.

Aspect 30: A process according to any of Aspects 27 to 29, further comprising removing particulates and water from the moist inert gas stream to produce the inert gas stream.

Aspect 31: A process according to Aspect 30, further comprising increasing the pressure of the inert gas stream prior to transferring the third portion of the heat amount to the inert gas stream.

Aspect 32: A process according to any of Aspects 27 to 31, further comprising adding an oxygen-enriched stream to the combustion air stream prior to combusting the dried solid fuel; and controlling one or both of a flow rate of the oxygen-enriched stream and a location of adding the oxygen-enriched stream to control one or more of the following properties: steam temperature, steam pressure, steam drum level, stoker grate temperature, temperature of the combustion products stream prior to transferring the first portion of the amount of heat to generate steam, temperature of the combustion products stream after transferring the second portion of the amount of heat the preheat the combustion air, temperature of the combustion products stream after transferring the third portion of the amount of heat to the recirculating thermal fluid, temperature of the moist oxygen-depleted gas stream, temperature of the dried solid fuel, moisture level of the high-moisture solid fuel, and moisture level of the dried solid fuel.

Aspect 33: A process according to Aspect 32, wherein the oxygen-enriched stream and the inert gas stream are both produced by the same air separation unit.

Aspect 34: A process according to any of Aspects 27 to 33, wherein when bypassing a portion of the combustion air stream, increasing or decreasing the amount of the portion of the combustion air stream bypassing indirect heat exchange with the combustion products stream to control one or more of the following properties: temperature of the combustion products stream prior to transferring the third portion of the amount of heat to the recirculating thermal fluid, temperature of the combustion products stream after transferring the third portion of the amount of heat to the recirculating thermal fluid, moisture content of the dried solid fuel, or moisture content of the inert gas stream after contacting with the high-moisture solid fuel; and wherein when bypassing a portion of the combustion products stream, increasing or decreasing the amount of the portion of the combustion products stream bypassing indirect heat exchange with the combustion air stream to control one or more of the following properties: temperature of the combustion product stream prior to transferring the third portion of the amount of heat to the recirculating thermal fluid, temperature of the combustion product stream after transferring the third portion of the amount of heat to the recirculating thermal fluid, moisture content of the dried solid fuel, or moisture content of the inert gas stream after contacting with the high-moisture solid fuel.

Aspect 35: An apparatus for generating steam comprising a dryer configured and arranged to create contact between a high-moisture solid fuel and a heated inert gas stream and to produce a dried solid fuel; a combustion air system having an air inlet for receiving air and a combustion air outlet for discharging the combustion air stream; a boiler comprising a radiant section, a convective section, and an energy recovery section, the radiant section being configured and arranged to receive the dried solid fuel from the dryer and the combustion air stream from the combustion air system, and to combust the dried solid fuel with a combustion air stream to produce a combustion products stream and an amount of heat, the radiant section having a first port to introduce at least a portion of the combustion air stream below a feed location of the dried solid fuel, the convective section having an auxiliary heat exchanger in fluid flow communication with the radiant section for heating water by indirect heat exchange with the combustion products stream to produce steam, and the energy recovery section including an air preheater for preheating the combustion air stream by indirect heat exchange with the combustion products stream; and an auxiliary heat exchanger for heating a first heat transfer fluid; one or both of a combustion air bypass conduit including a combustion air bypass control valve to enable controlled diversion of a portion of the combustion air stream around the air preheater and a combustion products bypass conduit including a combustion products bypass valve to enable controlled diversion of a portion of the combustion product stream around the air preheater; and a hybrid heat exchanger for heating an inert gas stream be indirect heat exchange with the first heat transfer fluid to produce the heated inert gas stream.

Aspect 36: An apparatus according to Aspect 35, the dryer having an inlet section and an outlet section, the inlet section including a high-moisture solid fuel inlet and a moist inert gas stream outlet; the outlet section including a high-moisture solid fuel outlet, and a heated inert gas inlet.

Aspect 37: An apparatus according to Aspect 35 or Aspect 36, the combustion air system further having an oxygen inlet for receiving oxygen and one or more oxygen control valves to enable controlled oxygen enrichment of the combustion air stream upstream of the combustion air outlet.

Aspect 38: An apparatus according to Aspect 37, further comprising one or more sensors each configured and arranged to provide a signal indicative of a process variable selected from: steam temperature, steam pressure, moisture at the high-moisture solid fuel inlet, moisture at the high-moisture solid fuel outlet, and moisture at the inert gas stream outlet; and an oxygen control loop programmed to control the one or more oxygen control valves to increase or decrease the oxygen enrichment of the combustion air stream based on the signal of the one or more of the sensors.

Aspect 39: An apparatus according to any of Aspects 35 to 38, further comprising one or more sensors each configured and arranged to provide a signal indicative of a process variable selected from: moisture at the high-moisture solid fuel outlet, moisture at the inert gas stream outlet, temperature sensor of the combustion products stream in the radiant section, and temperature of the combustion products stream in the convective section; and when the apparatus includes a combustion air bypass conduit, a combustion air bypass control loop programmed to control the combustion air bypass control valve to increase or decrease the portion of the combustion air stream bypassing indirect heat exchange with the combustion products stream based on the signal from one or more of the sensors, and when the apparatus includes a combustion products bypass conduit, a combustion products bypass control loop programmed to control the combustion products bypass control valve to increase or decrease the portion of the combustion products stream bypassing indirect heat exchange with the combustion air stream based on the signal from one or more of the sensors.

Aspect 40: An apparatus according to any of Aspects 35 to 39, the radiant section further having a second port to introduce at least a portion of the combustion air stream above the feed location of the dried solid fuel.

BRIEF DESCRIPTION OF THE DRAWINGS

The present invention will hereinafter be described in conjunction with the appended figures wherein like numerals denote like elements.

DETAILED DESCRIPTION

Figure 1:
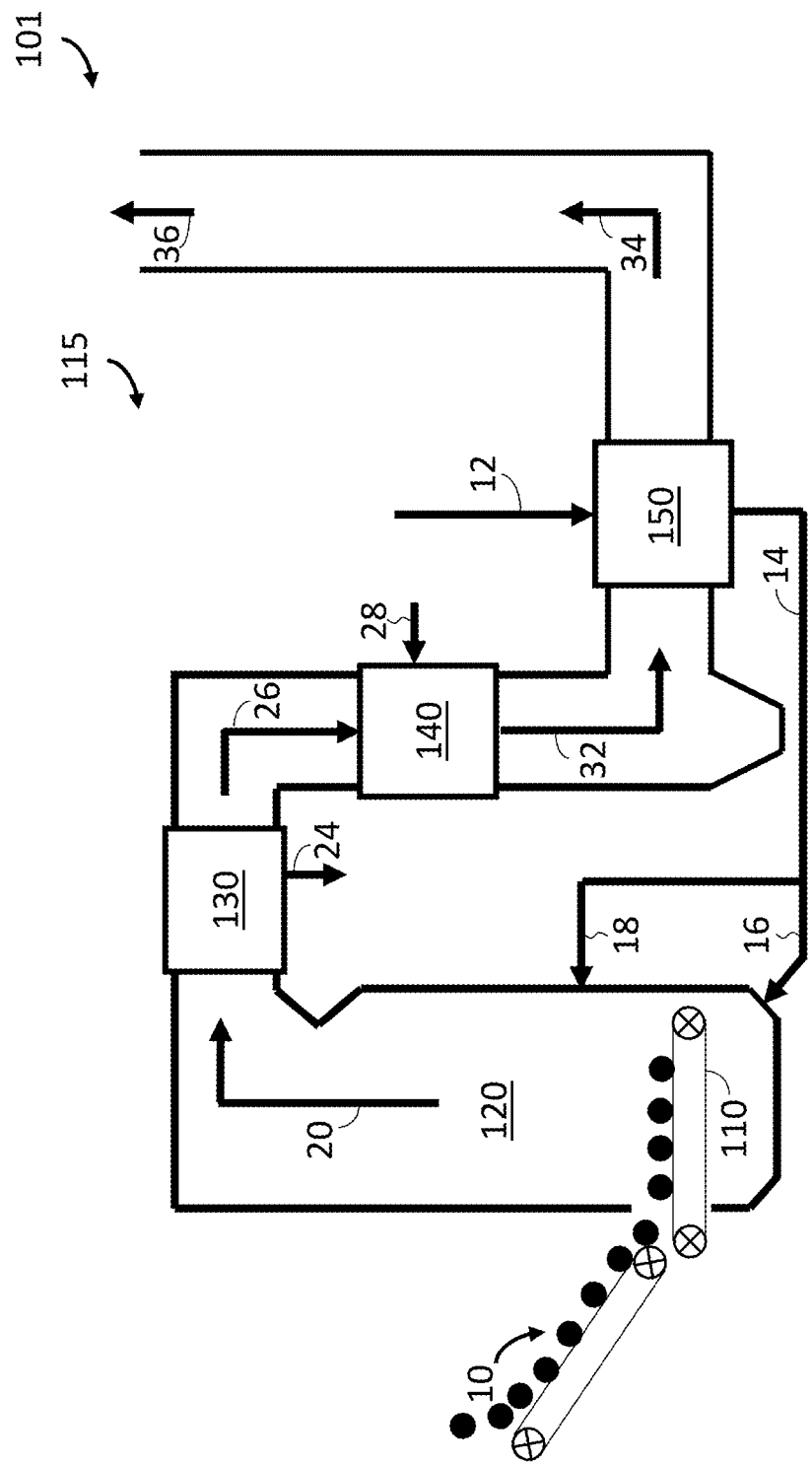
FIG. 1 is a flowsheet schematic depicting a prior art steam generation process.

FIG. 1 shows a prior art embodiment a system 101 for combusting a solid fuel 10 to generate steam including boiler 115. The solid fuel 10 may have a high moisture content, in which case it would be high moisture solid fuel. The solid fuel 10 enter a radiant section 120 of the boiler 115 where radiant heat transfer dominates over convective heat transfer. The boiler 115 is depicted as a stoker, or grate-fired, boiler, which typically will have a grate 110 with holes sized to hold particles of the solid fuel 10 but still allow the passage of a primary combustion air stream 16 up through the grate 110 to facilitate combustion. The boiler 115 may otherwise be a fluidized bed boiler, cyclone boiler, pulverized fuel boiler or any other boiler configured to receive and efficiently combust the fuel particles 10.

An air stream 12 is preheated in an air preheater 150 to form a combustion air stream 14, which can then be divided into two or more streams as dictated by the geometry of the boiler. In the case of the stoker boiler 115 shown in FIG. 1, at least a portion of the combustion air stream 14 can be divided to form the primary combustion air stream 16 that enters below the grate 110 and provides the critical fast combustion reaction, and a secondary combustion air stream 18 that may be used above the grate 110 to improve combustion, in particular by oxidizing any volatile organic compounds or partially oxidized compounds like carbon monoxide. The combustion of the solid fuel 10 first provides heat to the radiant section 120 to convert water to steam, after which gaseous combustion products stream 20 having an amount of heat enters a convective section of the bolier 101, comprising a superheater 130 and an economizer 140. Finally, gaseous combustion products stream 32 enters an energy recovery section comprising an air preheater 150.

As used herein, the phrase "at least a portion" means "a portion or all." The "at least a portion of a stream" has the same composition, with the same concentration of each of the species, as the stream from which it is derived.

The combustion products stream 20 enters the superheater 130, which is an indirect heat exchanger between the combustion products stream 20 and a water or saturated steam stream (not shown). The superheater 130 extracts heat from the combustion products stream 20 into the water or saturated steam stream to generate a superheated steam stream 24 by indirect heat exchange, while at the same time, converting the combustion products stream 30 into a first cooled combustion products stream 26 that has lost a portion of the amount of heat originally carried by the combustion products stream 20. Streams 20 and 26 have the same composition.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. As used herein, "first," "second," "third," etc. are used to distinguish among a plurality of steps and/or features, and is not indicative of the total number, or relative position in time and/or space, unless expressly stated as such.

The first cooled combustion products stream 26 then enters the economizer 140 and indirectly transfers heat to a water stream 28 to form a heated water stream (not shown), which can then be used directly by downstream processes or heated further to produce more steam. At the same time, the economizer 140 converts the first cooled combustion products stream 26 into a second cooled combustion products stream 32 which has lost even more of the original amount of heat. But streams 20, 26, and 32 still all have the same composition.

The second cooled combustion products stream 32 then provides heat to the air preheater 150, as discussed above heating the air stream 12 to produce the combustion air stream 14, and leaving a third cooled combustion products stream 34 which then exits the flue as exhaust gas 36.

It will be appreciated by a person of skill in the art that FIG. 1 illustrates one type of steam generation process, but the general principles can be applied to any steam generation system in heating water by radiative and convective heat transfer to make saturated and/or supersaturated steam.

FIGS. 2 through 8 show various embodiments of systems specifically designed to handle high moisture solid fuels as an input, and to do so much more efficiently that the prior art system 101 discussed above with reference to FIG. 1.

Figure 2:
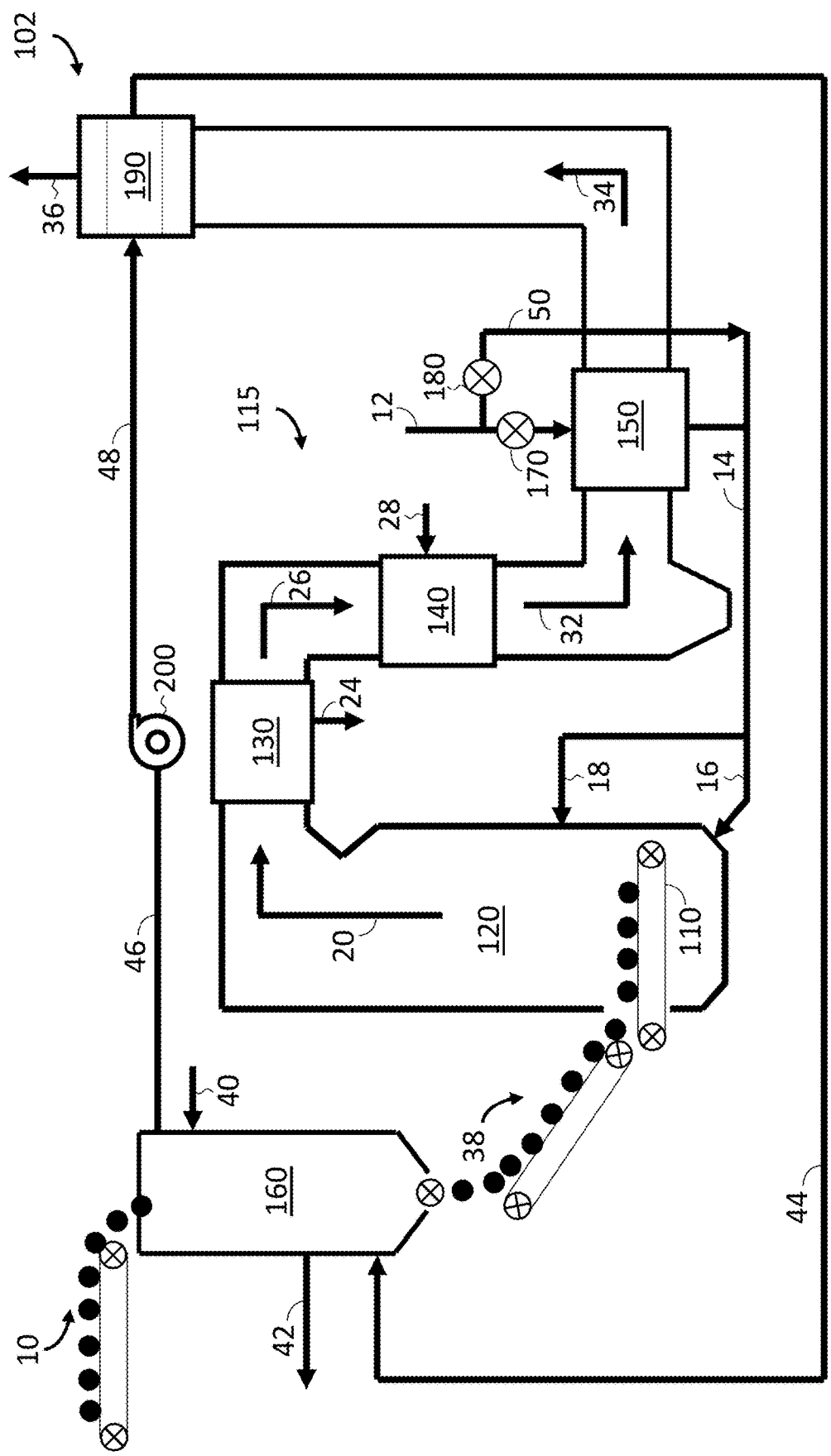
FIG. 2 is a flowsheet schematic depicting an embodiment of a steam generation process in which the fuel is first dried using a recirculating thermal fluid that is heated by the combustion products.

FIG. 2 illustrates an embodiment of a system 102 that, in addition to the boiler 115, incorporates a dryer 160 configured to receive high moisture solid fuel 10 and discharge a dried solid fuel 38. The dryer 160 utilizes an oxygen-depleted blanketing gas 40 such as nitrogen, carbon dioxide, argon or any other suitable inert gas (i.e., a gas that does not promote an oxidizing reaction with the solid fuel 10), having oxygen concentration less than about 5 vol %, preferably less than about 3 vol %, more preferably less than about 1 vol % to extract moisture from the high moisture solid fuel 10. The blanketing gas 40 is injected into the dryer 160 where it contacts the high moisture solid fuel 10, suppressing fuel ignition while simultaneously removing moisture. After removal of moisture, the high moisture solid fuel 10 is converted to the dried solid fuel 38, which is then discharged from the dryer 160. A moist blanketing gas 42 then exits the dryer vessel and is subsequently vented to a safe location while the dried solid fuel 38 is delivered to the radiant section 120.

The low oxygen concentration of the blanketing gas 40 is essential as wet solid fuels are prone to decomposition reactions leading to self-heating and loss of chemical energy content as well as to off-gassing of combustible vapors. The low oxygen concentration is effective in both reducing the extent of decomposition reactions and preventing ignition of combustible off-gasses such as carbon monoxide and hydrocarbon vapors. The term "depleted" means having a lesser mole percent concentration of the indicated component than the original stream from which it was formed. "Depleted" does not mean that the stream is completely lacking the indicated component.

Preferably, the blanketing gas 40 also has low water vapor concentration. This is because the low water vapor enables a larger amount of fuel moisture to be evaporated before saturation of the blanketing gas 40 is achieved. Moreover, the mass transfer rate of water vapor diffusion from the fuel surface to the blanketing gas 40 is proportional to the difference in water vapor partial pressure, $P_{wat,fs} - P_{wat,bg}$, where $P_{wat,fs}$ is the water vapor partial pressure in equilibrium with the surface of the fuel and $P_{wat,bg}$ is the water vapor partial pressure in the blanketing gas 40. Hence, as $P_{wat,bg}$ is reduced, the rate of water vapor diffusion to the blanketing gas 40 is increased leading to higher amounts of fuel moisture removal per unit of vessel volume in the dryer 160. For those reasons the blanketing gas 40 may have a moisture content of less than 1 mol %, preferably less than 0.5 mol %.

The dryer 160 is heated by indirect heat exchange using a heated recirculating thermal fluid 44 which, after heating the dryer 160, leaves the dryer 160 as a cooled recirculating thermal fluid 46. A pump 200 is used to circulate the thermal fluid, taking in the cooled recirculating fluid 46 and discharging a pumped recirculating thermal fluid 48 which is heated in by indirect heat exchange in an auxiliary heat exchanger 190 by the third cooled combustion products stream 34, resulting in the exhaust stream 36 being even cooler than the third cooled combustion products stream 34. The design of the dryer 160 may be similar to that of a rotary kiln, a fluidized bed, one of a variety of motor-driven screws or conveyors, or other devices not explicitly mentioned herein. In FIG. 2 the energy recovery section further comprises the auxiliary heat exchanger 190.

In the embodiment of FIG. 2, the air preheater 150 is combined with a bypass system comprising an air preheater valve 170 and a combustion air bypass valve 180 that are configured to control a fraction of the air stream 12 that flows through the air preheater 150 and a remaining fraction of the air stream 12 that bypasses the air preheater 150 as a combustion air bypass stream 50. It will be appreciated that bypassing or diverting all or a portion of the air stream 12 around the air preheater 150 will result in a lower amount of heat transfer taking place between the second cooled combustion products stream 32 and the air stream 12 than if 100% of the air stream 12 passed through the heat exchanger of the air preheater 150 (i.e., zero bypass). Hence, bypassing a portion of the air stream 12 yields lower temperature combusitn air 14 (i.e., 16, 18) entering the radiant section 120 and higher temperature in the third cooled combustion products stream 34 relative to the zero-bypass case. As a result, bypassing a portion of the air stream 12 would be expected to result in more heat transferred by to recirculating thermal fluid in the auxiliary heat exchanger 190, and thus more heat transferred to the dryer 160, reflecting a tradeoff between the amount of preheating provided to the combustion air 14 and relative dryness of the solid fuel 38.

Figure 9B:
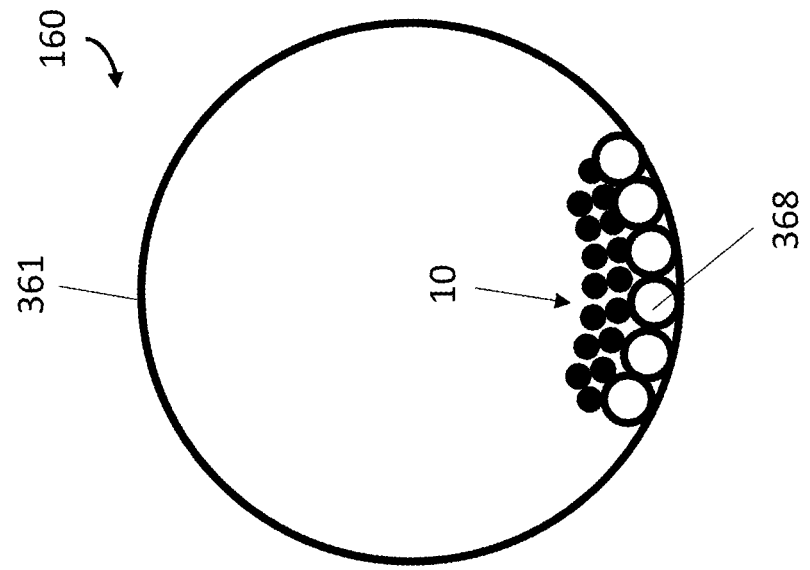
FIG. 9B is a cross-section showing an embodiment of a fuel dryer in which a recirculating fluid flows through pipes that pass through the dryer.
Figure 9A:
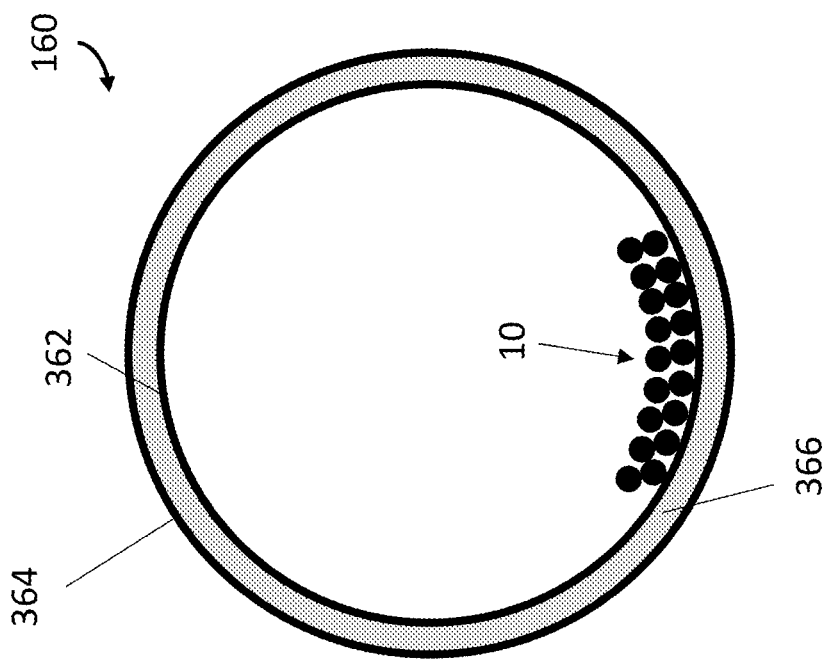
FIG. 9A is a cross-section showing an embodiment of a fuel dryer in which a recirculating fluid flows through an annular space in a double-walled vessel.

FIGS. 9A and 9B show cross sections which illustrate two possible embodiments for the plumbing of the dryer 160. The embodiment of FIG. 9A has a double wall dryer with an inner wall 362, and outer wall 364, and an annular space 366 between the walls 362 and 364 in which the recirculating thermal fluid 44 flows. The embodiment of FIG. 9B has a single-walled vessel 361 and heat transfer pipes 368 within the vessel 361 through which the recirculating thermal fluid 44 flows. While these two embodiments are exemplary, any configuration of the dryer 160 may be used that that allows indirect heat exchange to the contents of a vessel may be used.

Figure 3:
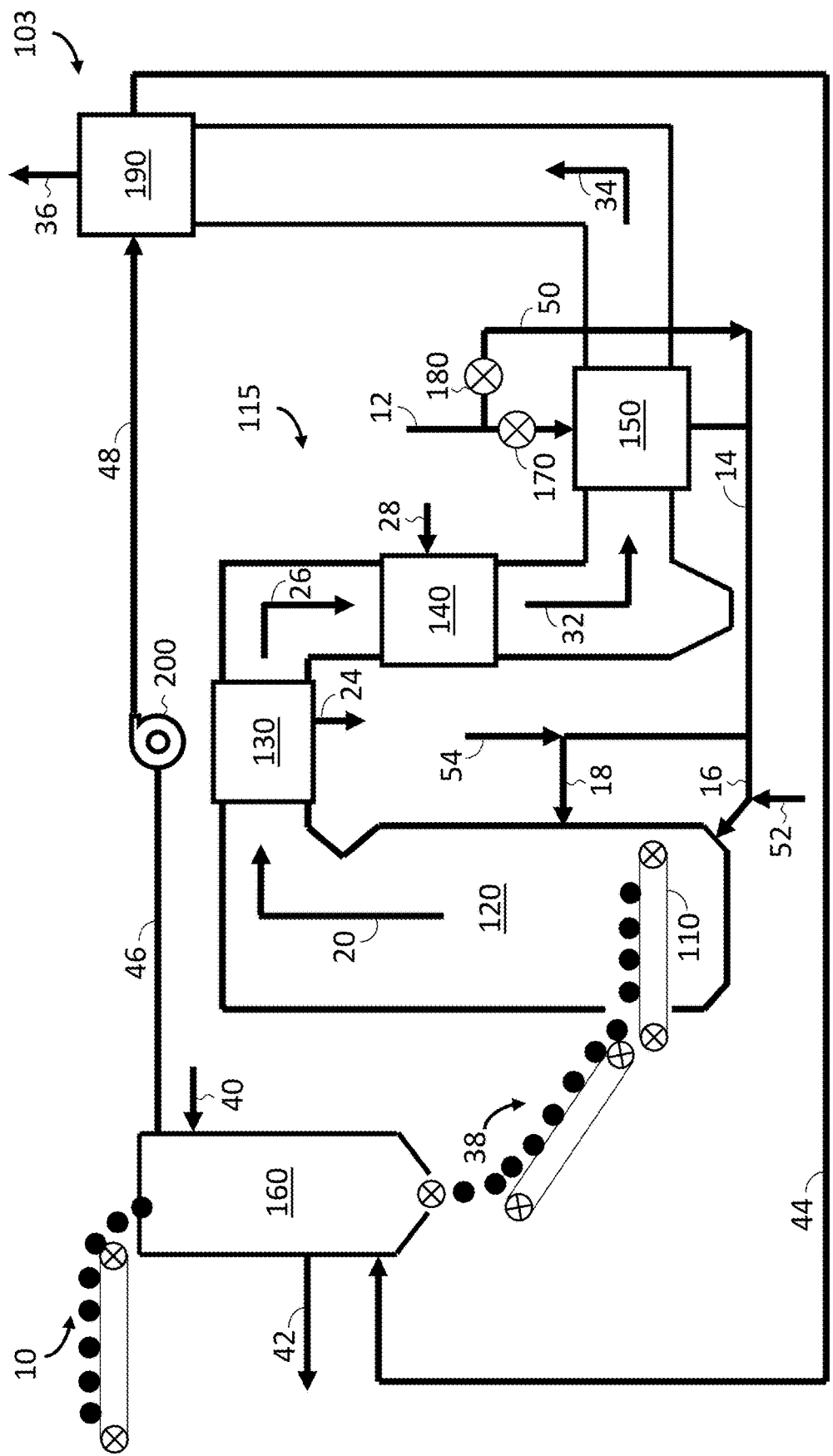
FIG. 3 is a flowsheet schematic depicting a modification of the embodiment of FIG. 2 in which the level of oxygen enrichment is increased or decreased to control the combustion properties of the boiler and/or the conditions in the steam generator.
Figure 4:
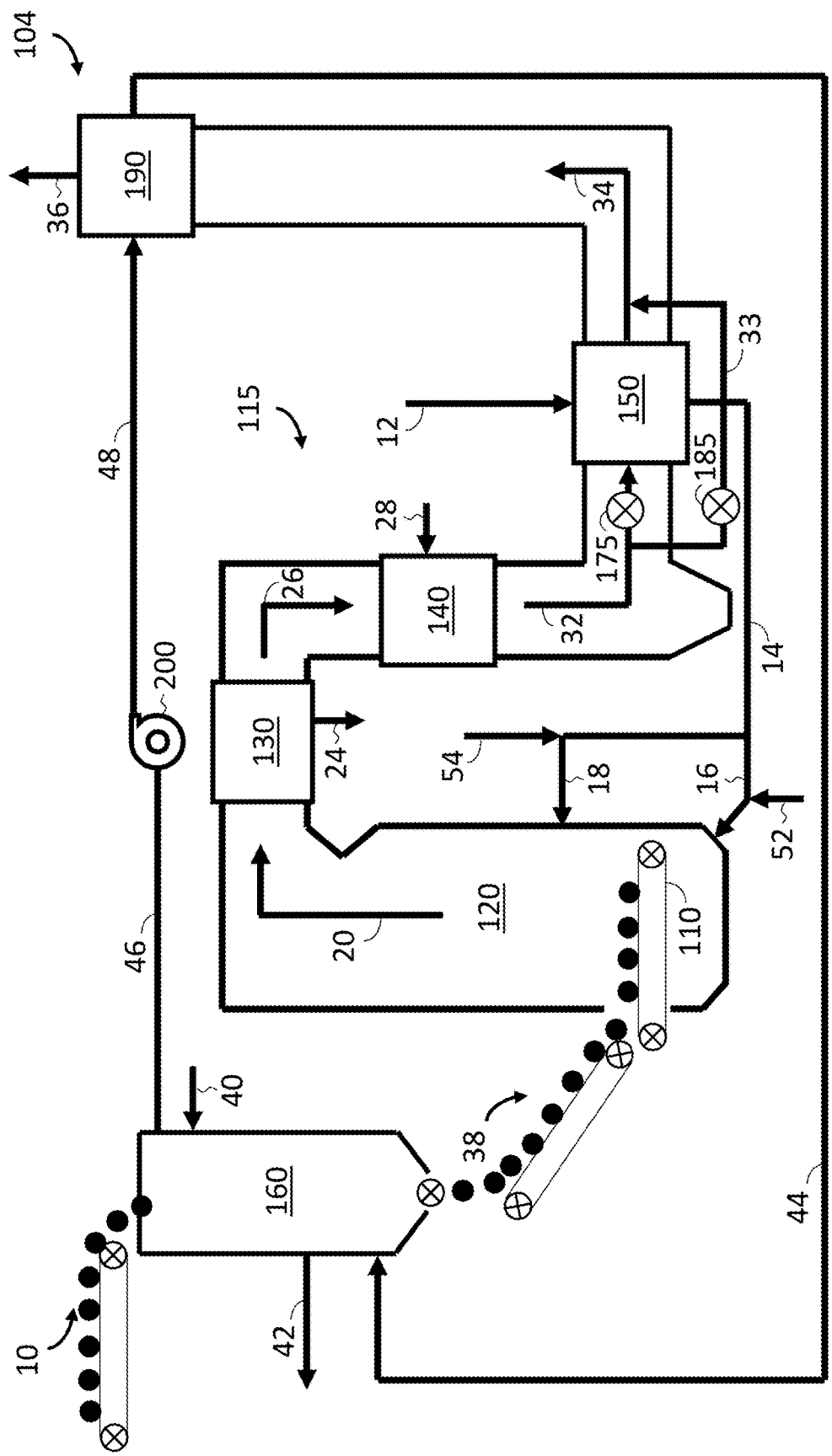
FIG. 4 is a flowsheet schematic depicting a modification of the embodiment of FIG. 3 in which the flow rate of the combustion products bypass stream is increased or decreased to control the amount of water removed from the wet solid fuel in the dryer by increasing or decreasing the amount of heat that can be transferred to the recirculating thermal fluid.

FIG. 3 illustrates an embodiment of a system 103 which, in addition to the features described in the system 102 of FIG. 2, further includes direct or indirect injection of a gas having an oxygen concentration of at least 30 vol %, preferably at least 80 vol % and most preferably 90 vol % or higher into the boiler 115 to promote oxygen-enriched combustion. The term "enriched" means having a greater mole percent concentration of the indicated component than the original stream from which it was formed. Indirect injection comprises oxygen introduction into one or more of the combustion air streams 16, 18 entering the boiler 115, while direct injection comprises an undiluted oxygen stream entering the boiler via a dedicated oxygen conduit (not shown). FIG. 4 shows indirect injection where a primary oxygen-enriched stream 52 is introduced with the primary combustion air stream 16 beneath the grate 110 and a secondary oxygen-enriched stream 54 is introduced with the secondary combustion air stream 18 above the grate 110. This allows independent control of oxygen enrichment for the primary combustion air stream 16 and secondary combustion air stream 18. An alternative embodiment could introduce a single oxygen-enriched stream into one or more of streams 12, 14, or 50.

Figure 3A:
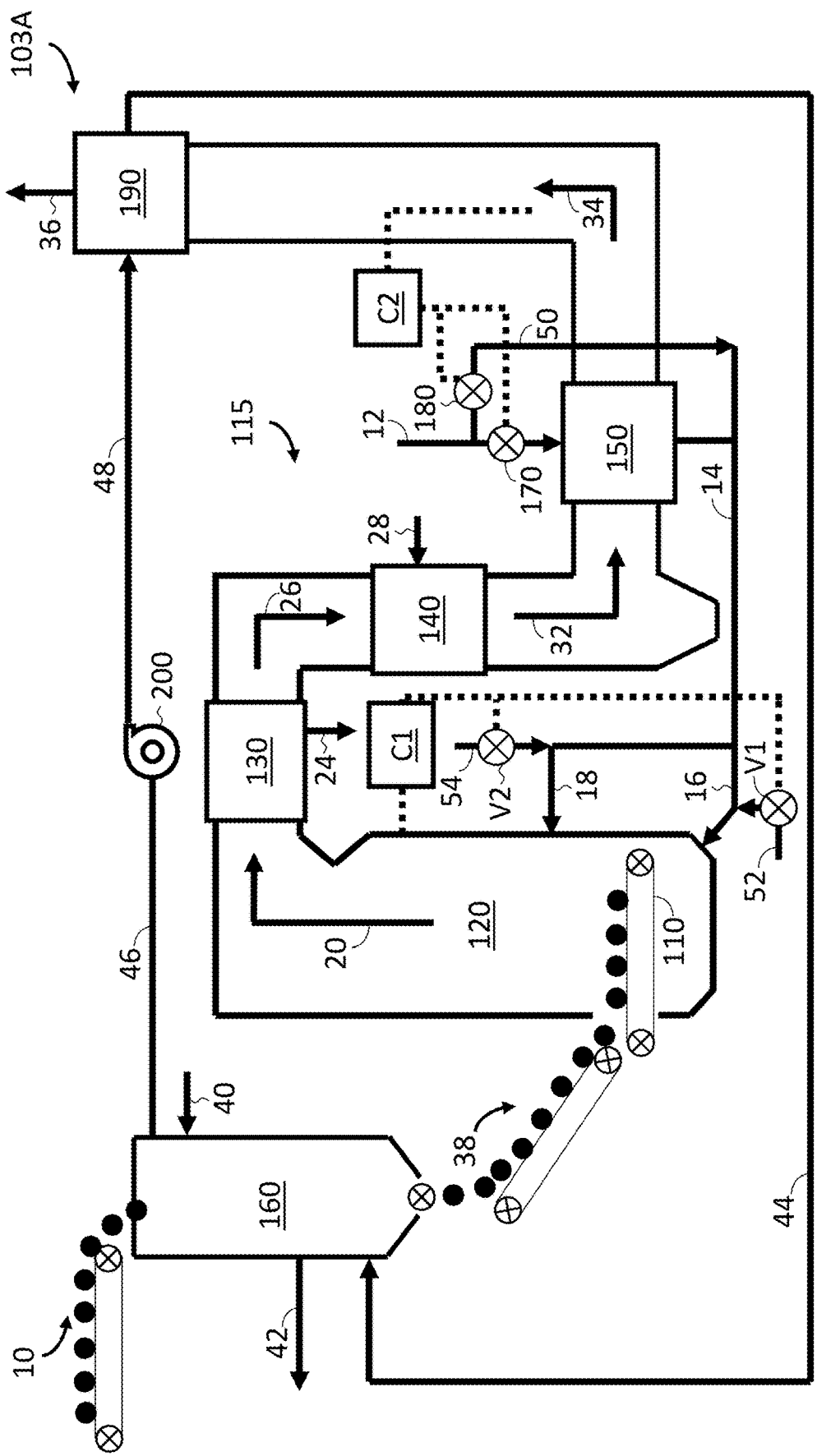
FIG. 3A is a flowsheet schematic depicting a modification of the embodiment of FIG. 4 in which conditions in the boiler are used to increase or decrease the amount of oxygen enrichment and/or combustion air bypass flow rate.

FIG. 3A illustrates an embodiment of a system 103A with a controller C1 configured to increase or decrease the oxygen enrichment of the primary combustion air stream 16 and/or the secondary combustion stream 18. Any number of process variables may be monitored to control the level or location of oxygen enrichment, including steam temperature, steam pressure, boiler grate temperature, temperature of the combustion products stream 20, moisture content of the high-moisture solid fuel 10, and moisture content of the dried solid fuel 38. In FIG. 3A, the controller C1 receives electrical signals indicative of the the variable(s) of interest. The controller C1 is programmed, based on those signals to control or adjust a flow rate of the primary oxygen-enriched stream 52 via a primary oxygen control valve V1 and/or a flow rate of the secondary oxygen-enriched stream 54 via a secondary oxygen control valve V2.

"Downstream" and "upstream" refer to an intended flow direction of a process fluid transferred. If the intended flow direction of the process fluid is from a first device to a second device, the second device is downstream of the first device. In case of a recycle stream, downstream and upstream refer to a first pass of the process fluid.

The system 103A of FIG. 3A also includes a controller C2 configured to increase or decrease a flow rate of the combustion air bypass stream 50. Any number of process variables may be monitored to control the combustion air bypass flow rate, including temperature of the second cooled combustion products stream 32, temperature of the third cooled combustion products stream 34, moisture content of the dried solid fuel 38, or moisture content of the moist blanketing gas 42. In the system 103A of FIG. 3A, the controller C2 receives an electrical signal indicative of the temperature of the third cooled combustion products stream 34. The controller C2 is programmed to use that signal to control a flow rate of the combustion air bypass stream 50 via the air preheater valve 170 and/or the combustion air bypass valve 180. In practice, the controllers C1 and C2 may be separate controllers or may be combined into a single controller with multiple control loops.

FIG. 4 illustrates an embodiment of a system 104 that is a variation of the system 103. In the system 104, a combustion products bypass stream 33 diverts a portion of the second colled combustion products stream 32 to bypass around the air preheater 150. The portion of bypass flow is controlled by a combustion products valve 175 regulating a flow of the second cooled combustion products stream 32 and a combustion products bypass valve 185 regulating a flow of the combustion products bypass stream 33. It will be appreciated that this bypass of combustion products has the same effect as bypassing combustion air around the air preheater 150 by reducing air preheat temperature and increasing flue gas temperature downstream of the air preheater 150.

Figure 4A:
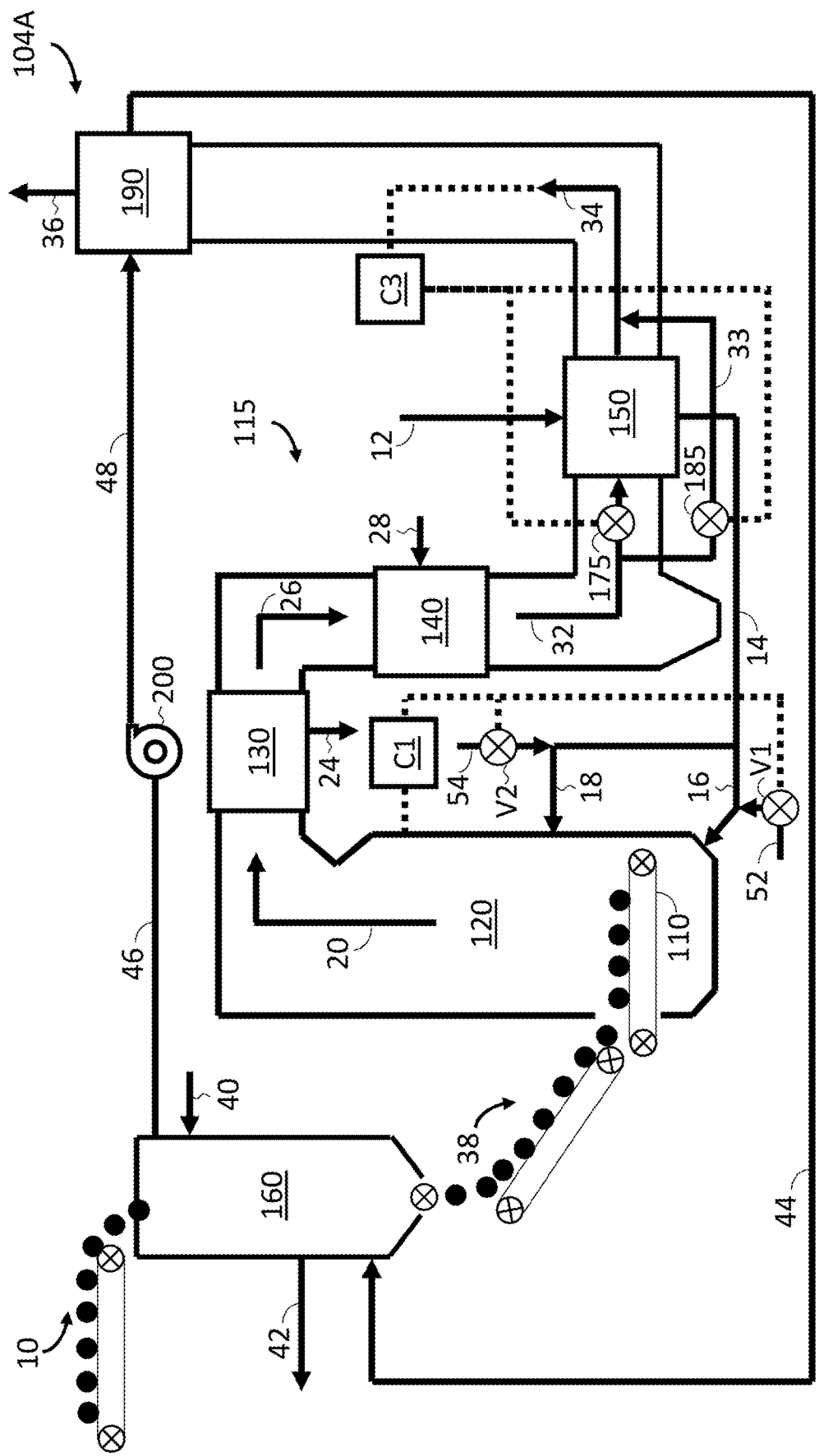
FIG. 4A is a flowsheet schematic depicting a modification of the embodiment of FIG. 4 in which conditions in the boiler are used to increase or decrease the amount of oxygen enrichment and/or combustion products bypass flow rate.

FIG. 4A illustrates an embodiment of a system 104A with a controller C3 configured to increase or decrease the flow rate of the combustion products bypass stream 33, and is a variation of the system 103A. Any number of properties may be monitored to control the combustion air bypass flow rate, including temperature of the second cooled combustion products stream 32, temperature of the third cooled combustion products stream 34, moisture content of the dried solid fuel 38, or moisture content of the moist blanketing gas 42. In the system 104A of FIG. 4A, the controller C3 receives an electrical signal indicative of the temperature of the third cooled combustion products stream 34. The controller C3 is programmed to use that signal to control a flow rate of the combustion products bypass stream 33 via the combustion products valve 175 and the combustion products bypass valve 185. In practice controllers C1 and C3 may be separate controllers or combined into a single controller with multiple control loops.

Figure 5:
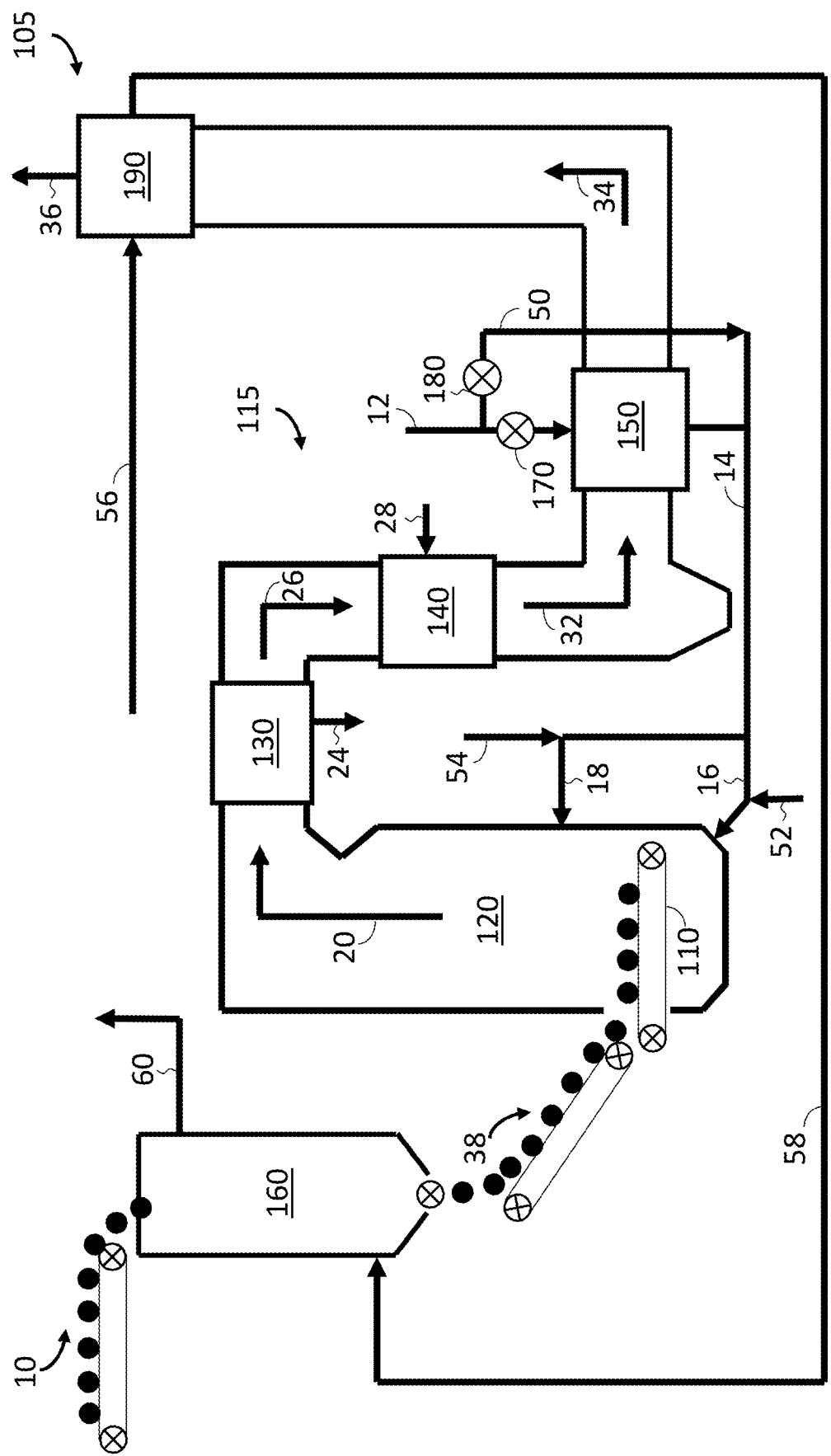
FIG. 5 is a flowsheet schematic depicting a modification of the embodiment of FIG. 3 in which the fuel is dried by an oxygen-depleted gas stream that has been heated by the combustion products.

FIG. 5 shows an alternate system 105 that utilizes an inert gas as both a first heat transfer fluid and a blanketing gas. An inert gas 56 is indirectly heated in the auxiliary heater 190 against the third cooled combustion products stream 34 to produce a heated inert gas stream 58 and an exhaust stream 36 that is cooler that the third coold combustion products stream 34. The heated inert gas stream 58 is then directly contacted with the high moisture solid fuel 10 in the dryer 160, carrying away the moisture as a moist inert gas stream 60 which leaves the dryer 160 and is vented. Oxygen enrichment via the primary oxygen-enriched stream 52 and/or the secondary oxygen-enriched stream 54 may optionally be included in the system 105.

The system 105 could be advantageous when a large quantity of relatively inert, dry gas is available at a reasonable cost. Such a circumstance may exist when a large air separation unit is required to produce oxygen to be used in the boiler 115 or other oxygen-intensive use and dry nitrogen is produced as a by-product or off-gas.

Figure 6:
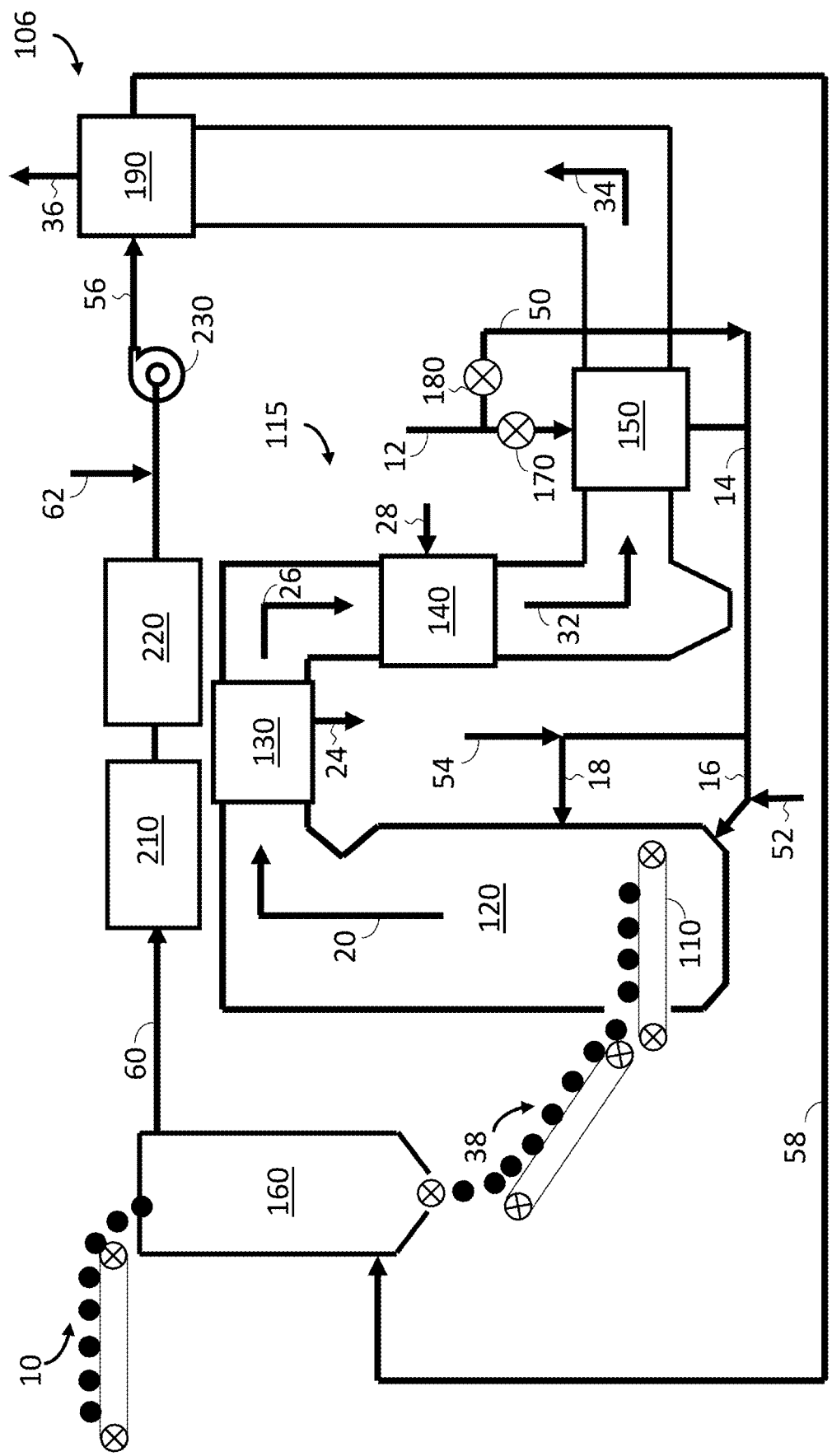
FIG. 6 is a flowsheet schematic depicting a modification of the embodiment of FIG. 5 in which the oxygen-depleted gas stream forms a closed loop by introducing a particulate removal system, condenser, and blower.

In contrast to the system 105 which includes a once-through flow of inert gas, the inert gas could be recycled as shown in FIG. 6 as a system 106. In order to recycle the moist inert gas stream 60, it may first be treated in a particulate removal unit 210, if needed. Further, water is removed from the moist inert gas stream 60 in a condenser 220 before being recompressed in a blower 230 to form the the inert gas stream 56. An inert gas make-up stream 62 may be introduced anywhere along the loop, for example before the blower 230 as shown in FIG. 6. Oxygen enrichment via the primary oxygen-enriched stream 52 and/or the secondary oxygen-enriched stream 54 may optionally be included in the system 106.

Figure 7:
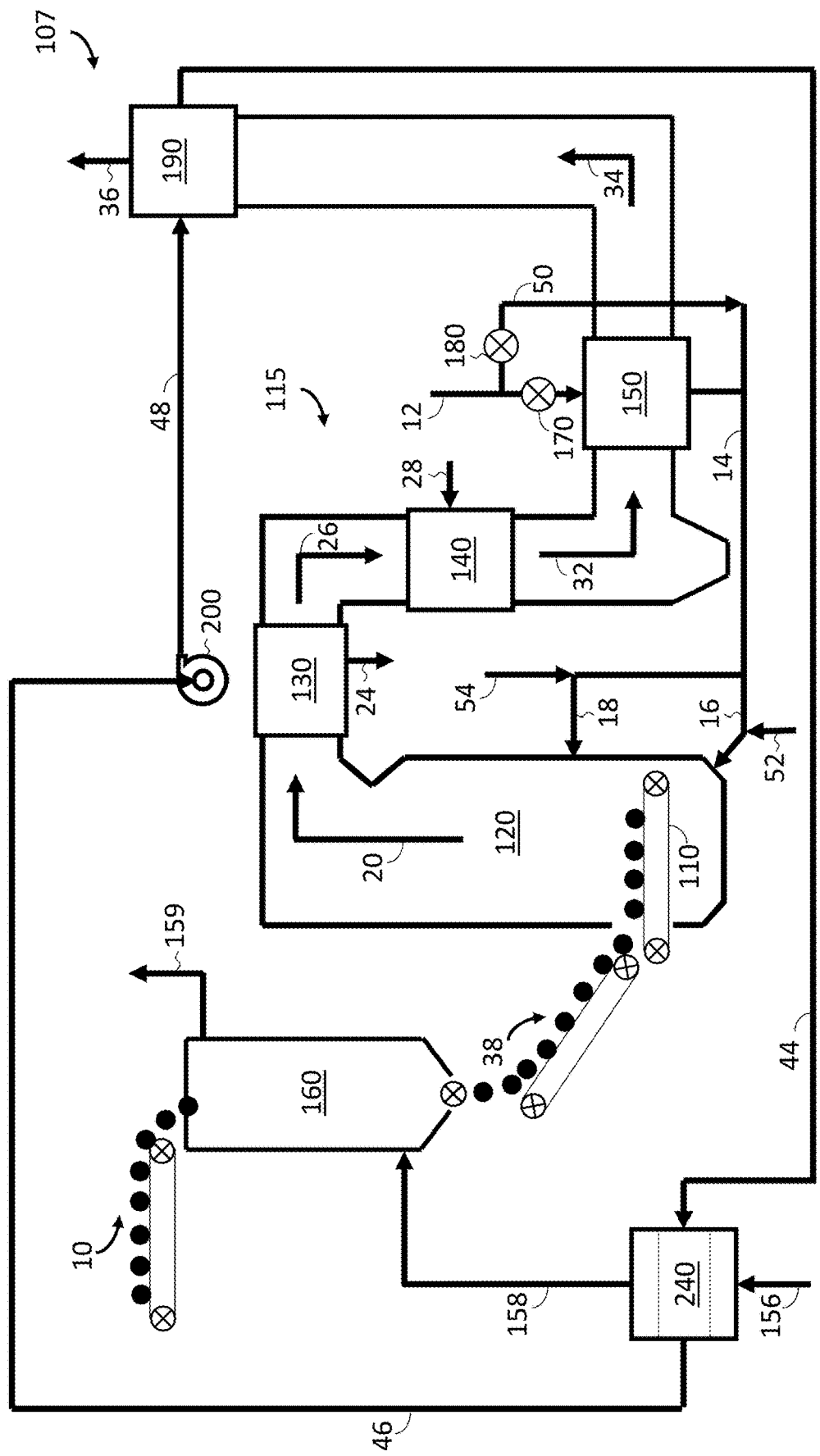
FIG. 7 is a flowsheet schematic depicting a modification of the embodiment of FIG. 5 in which the heating duty for the oxygen-depleted gas stream is transferred from the combustion products by a thermal recirculating fluid.

FIG. 7 illustrates a system 107 which can be considered a hybrid configuration that utilizes a first heat transfer fluid to heat a blanketing gas that, in turn, heats, dries and blankets the high moisture solid fuel 10 in the dryer 160, then exhausts evaporated moisture from the dryer 160. The system 107 includes a recirculating thermal fluid loop as in the system 102. However, in the system 107, the heated thermal fluid 44 indirectly transfers heat via a hybrid heat exchanger 240 instead of to the dryer 160. The hybrid heat exchanger 240 then heats an inert gas stream 156 to form a heated inert gas stream 158. Then, as in the system 105, the heated inert gas stream 158 dries the high moisture solid fuel 10 in the dryer 160 and exits the dryer 160 as a moist inert gas 159. The hybrid configuration can be useful when the dryer 160 is located a significant distance from the boiler 115 because over long distances a dense heat transfer fluid can be less expensive to circulate than an inert gas. Oxygen enrichment via the primary oxygen-enriched stream 52 and/or the secondary oxygen-enriched stream 54 is optional in the system 107.

Figure 8:
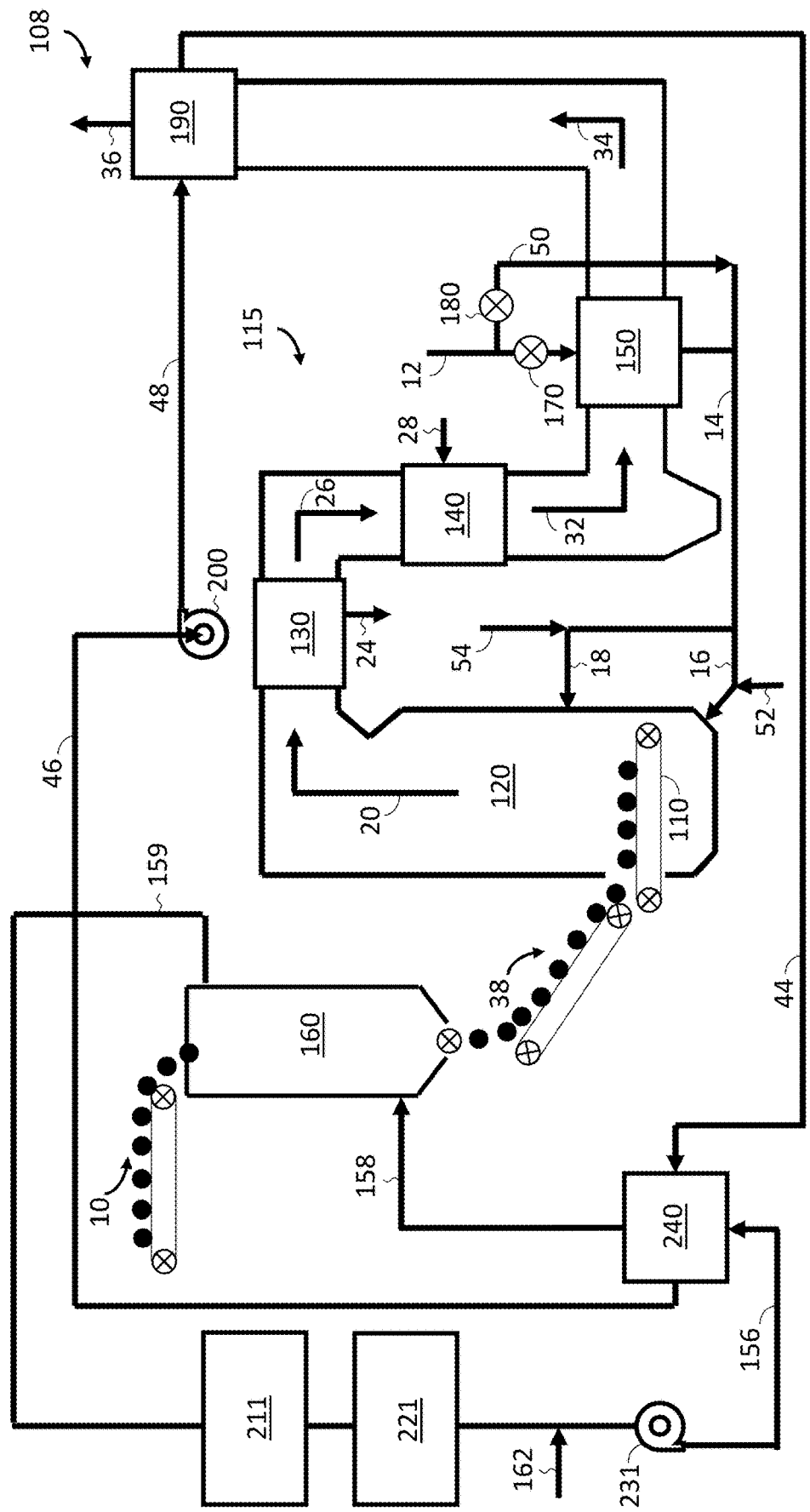
FIG. 8 is a flowsheet schematic depicting a modification of the embodiment of FIG. 6 in which the heating duty for the oxygen-depleted gas stream is transferred from the combustion products by a thermal recirculating fluid.

In the same way that the system 105 can be adapted for recycling the inert gas to create the system 106, the system 107 can be adapted for recycling the inert gas to create they system 108, as shown in FIG. 8. The system 108 introduces an optional particulate removal unit 211, a condenser 221, and a blower 231, to recycle the inert gas. Oxygen enrichment via the primary oxygen-enriched stream 52 and/or the secondary oxygen-enriched stream 54 is optional in the system 108.

Example 1

A fuel containing 50 wt % moisture enters a dryer at a rate of 20,000 kg/hr prior to entering a boiler. The process within the boiler requires that the incoming fuel moisture is reduced to 30 wt % prior to combustion. Heat for drying is available from the boiler flue gas at 200° C. The energy required to evaporate the fuel moisture is approximately:

$$Q_{evap}=(0.5-0.3)\times 20,000 \text{ kg/hr}\times 2250 \text{ kJ/kg}\times 1 \text{ hr}/3600 \text{ sec}=2500 \text{ kW}$$

where the latent heat of 2250 kJ/kg is based on an evaporation temperature of 90° C. Note that this estimate does not include the energy required to heat the water and solid fuel up to 90° C. Hence, the calculated energy transfer rate will be lower than actual, which is acceptable for the purpose of this illustrative example. Assuming dry nitrogen is the preferred blanketing gas, the mass flow rate of $N_2$ required to transfer this energy is:

$$M_{N2}=2500 \text{ kW}/[1.05 \text{ kJ/kg*K}\times 110° \text{ C.}]=21.7 \text{ kg/sec}\sim 77,900 \text{ kg/hr}=1870 \text{ metric tonnes}/day$$

which is nominally 20 times the mass of water being evaporated ($M_{water}/M_{N2}\sim 0.05$). Producing such a large quantity of dry nitrogen is economically prohibitive in many circumstances. However, as dry nitrogen at 90° C. can retain water vapor at a ratio of approximately $M_{water}/M_{N2}\sim 1.44$ at atmospheric pressure, this indicates a nitrogen requirement of only 67 metric tonnes/day would be required strictly from a mass transfer standpoint. Accordingly, in a preferred embodiment, dry nitrogen is used for fuel blanketing and capture/exhaust of evaporated moisture, while a heat transfer liquid such as any of a variety of commercially available thermal oils would be employed as the first heat transfer fluid.

Figure 10:
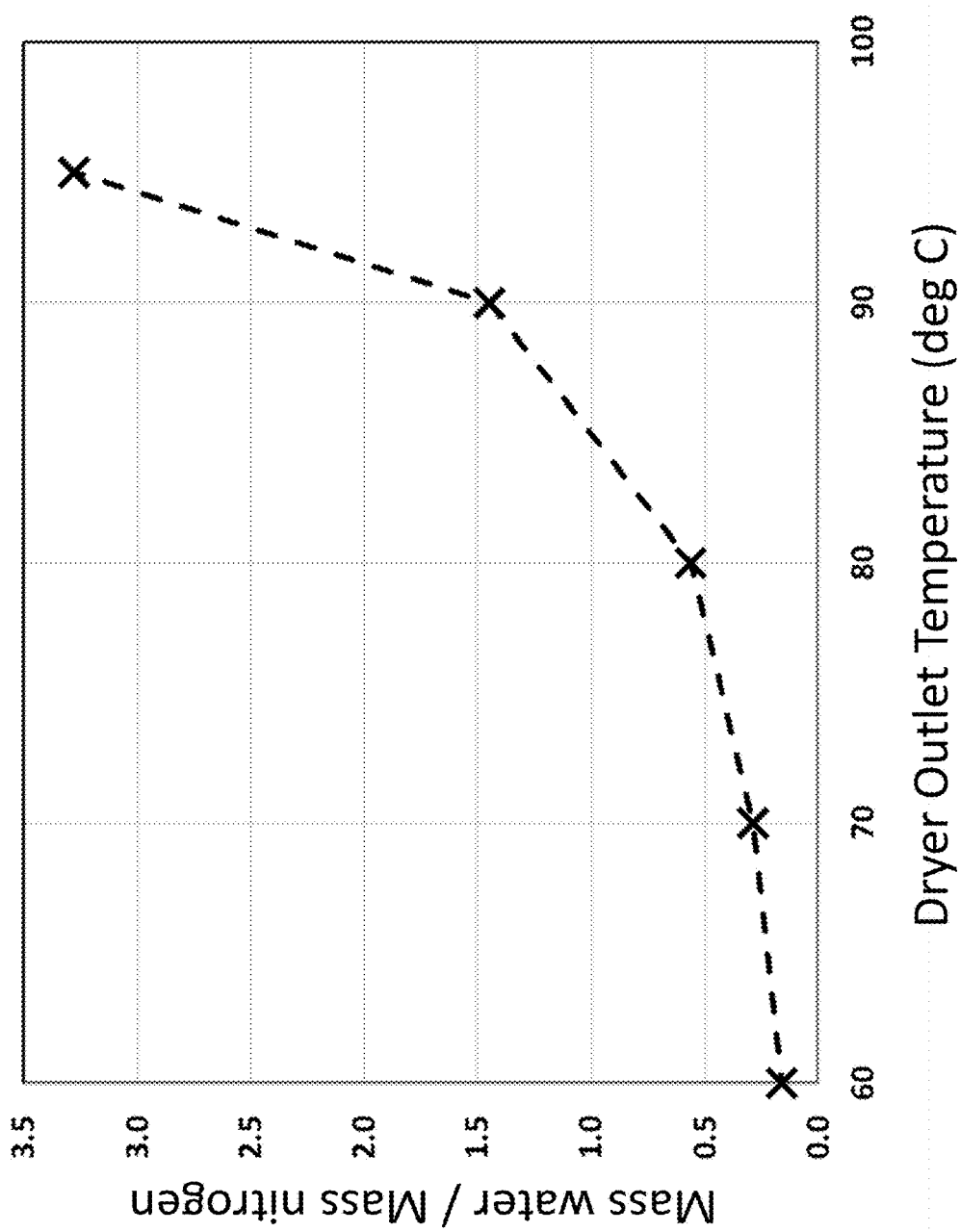
FIG. 10 is a graph showing the relationship between dryer outlet temperature and the amount of water vapor in a nitrogen stream.
Figure 11:
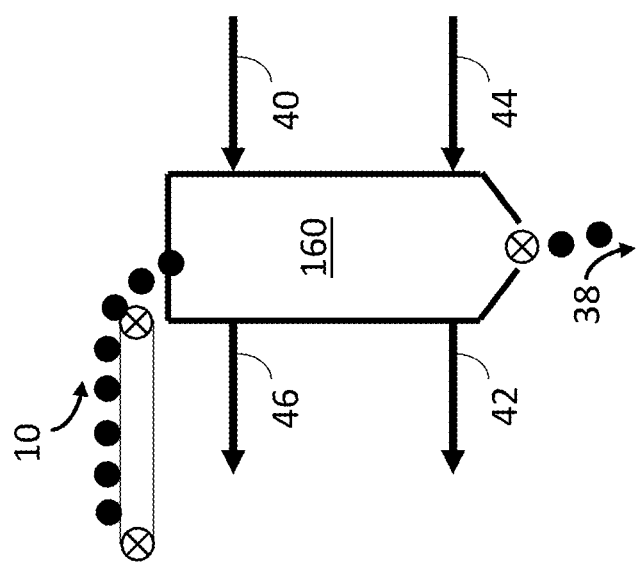
FIG. 11 is a schematic diagram showing the counter-current and co-current flow patterns in the fuel dryer.

Example 1 shows that, in such an embodiment, it is advantageous to maintain the mass ratio of evaporated water to nitrogen, $M_{water}/M_{N2}$, as high as possible to minimize the amount of nitrogen (or other blanketing gas) required within the dryer. The challenge is in simultaneously ensuring that the water vapor content of the mixture does not exceed a relative humidity of 100%. As the saturated water vapor pressure increases sharply with temperature, this implies a relationship between the evaporated water to nitrogen ratio, $M_{water}/M_{N2}$, and the minimum nitrogen temperature leaving the dryer. Assuming ideal gas behavior, it can be shown that, for a saturated mixture of $N_2$ and water vapor:

$$M_{water}/M_{N2}=0.643\times P_{water}(T)/[P_{dryer}-P_{water}(T)] \quad (1)$$

where $P_{water}(T)$ is the saturation pressure of water as a function of temperature, and $P_{dryer}$ is the operating pressure of the dryer. Assuming the dryer operates nominally at atmospheric pressure (1.013 bar) and employing the Clausius-Clapeyron equation to approximate the saturated water vapor pressure versus temperature relationship allows us to directly calculate the saturated water vapor to nitrogen mass ratio solely as a function of temperature. The results from such calculations, plotted in FIG. 10, indicate that the saturated water vapor to nitrogen mass ratio, $M_{water}/M_{N2}$, increases sharply as the temperature of the mixture is increased above 80° C. It is therefore highly preferred within this embodiment to operate the dryer with a nitrogen exit temperature of at least 80° C. Since fuel temperatures will increase within the dryer from ambient temperature at the inlet to the final fuel temperature leaving the dryer, it is therefore necessary within this embodiment for the dryer exit temperature to be at least 80° C. To prevent re-condensation of the evaporated moisture back to the fuel, it is further necessary that the evaporated water vapor/nitrogen mixture is exhausted from the dryer at a temperature of at least 80° C. One preferred method of achieving this latter condition is for the water vapor/nitrogen mixture to be exhausted from the dryer 160 at or near a fuel exit of the dryer 160 as depicted in FIG. 11. Typically streams are arranged in a counter-current arrangement for mass and/or heat transfer to maximize the driving force over the length of the unit operation. The heat transfer fluid 44, 46 flows counter-current to the high moisture solid fuel 10, as would be expected. However, in order to maximize the exit temperature of the moist blanketing gas 42, the blanketing gas 40 can be flowed counter-current to the heated recirculating thermal fluid 44 and co-current with the high-moisture solid fuel 10. The net result shows an unexpected benefit where the best mass transfer of moisture from the solid fuel to the oxygen-depleted gas stream is when they are flowing co-currently.

Example 2

The embodiments of both the prior art boiler 115 of FIG. 1 and the system 104 of FIG. 4 were analyzed using the commercially available Aspen process modeling software. Properties of the as-received fuel (i.e., the high moisture content fuel 10) are presented in the Proximate and Ultimate fuel analyses shown in Tables 1 and 2, respectively. Results for the baseline system showing key performance metrics are summarized in Table 3. Note that the combustion equivalence ratio is used to define the amount of excess oxygen used for combustion. The equivalence ratio is defined as the actual fuel-to-oxygen ratio divided by the fuel-to-oxygen ratio theoretically needed to completely combust the fuel. Hence, a combustion process with equivalence ratio less than unity involves the use of excess oxygen molecules.

TABLE 1

| Parameter | Units | Value |
| --- | --- | --- |
| Total as-Received Moisture Content | Wt % | 50 |
| Inherent Moisture Content | Wt % | 7.5 |
| Surface Moisture Content | Wt % | 42.5 |
| Ash Content | Wt % | 3.0 |
| Volatile Matter | Wt % | 38.4 |
| Fixed Carbon | Wt % | 8.6 |
| Higher Heating Value (HHV) | kJ/kg | 8991 |

TABLE 2

| Parameter | Units | Value |
| --- | --- | --- |
| Carbon | Wt % | 23.58 |
| Hydrogen | Wt % | 3.24 |
| Oxygen | Wt % | 19.96 |
| Nitrogen | Wt % | 0.19 |
| Sulfur | Wt % | 0.02 |

TABLE 3

| Parameter | Units | Value |
| --- | --- | --- |
| Fuel Flow Rate | Kg/hr | 21,355 |
| Steam Flow Rate | Kg/hr | 59,000 |
| Flue Gas Flow Rate | Kg/hr | 95,671 |
| Combustion Air Flow Rate | Kg/hr | 74,233 |
| Combustion Equivalence Ratio | N/A | 0.833 |
| Flame Temperature | Deg C. | 1404 |
| Air Heater Gas Inlet Temperature | Deg C. | 234 |
| Air Heater Gas Outlet Temperature | Deg C. | 160 |
| Boiler Efficiency (HHV basis) | % | 74.6 |

Input parameters varied in the modeling effort include an air bypass flow rate, an air heater inlet gas temperature, an oxygen enrichment level, and a fuel flow rate, while key results comprise a rate of fuel moisture evaporation occurring in the dryer (as represented by the as-fired fuel moisture content), boiler efficiency, flame temperature, a flue gas flow rate, and a steam flow rate. It was assumed that the flue gas flow rate could not be increased above the baseline value and, to minimize flue gas condensation, the stack temperature could not be lowered beneath 70° C. A final assumption was that unburned carbon loss due to combustion inefficiency could be neglected. While this is not the case, especially with high moisture fuels, prediction methods for unburned carbon energy loss are not sufficiently accurate for results to be included in this disclosure. Hence, the more complete combustion that would be expected to occur with fuel drying is herein neglected.

Four cases will be considered for Example 2, distinguished by the temperature of the second cooled combustion products stream 32 and the flow of the combustion air bypass stream 50 as a percentage of the air stream 12. The four cases are listed in Table 4. The base case, Case 1, has the lowest temperature combustion products stream entering the air preheater 150, then in Cases 2 through 4 the combustion air bypasses the air preheater 150 and then the temperature of the second cooled combustion products stream 32 increases to 280 and 350° C. Effectively as the examples progress from Case 1 to Case 4, the amount of heat energy available to the auxiliary heat exchanger increases, allowing more of the heat of combustion to be used for drying the fuel.

TABLE 4

| Case | Stream 32 T (° C.) | Stream 50 Flow/Stream 12 Flow |
|---|---|---|
| 1 | 234 | 0% |
| 2 | 234 | 100% |
| 3 | 280 | 100% |
| 4 | 350 | 100% |

Figure 12:
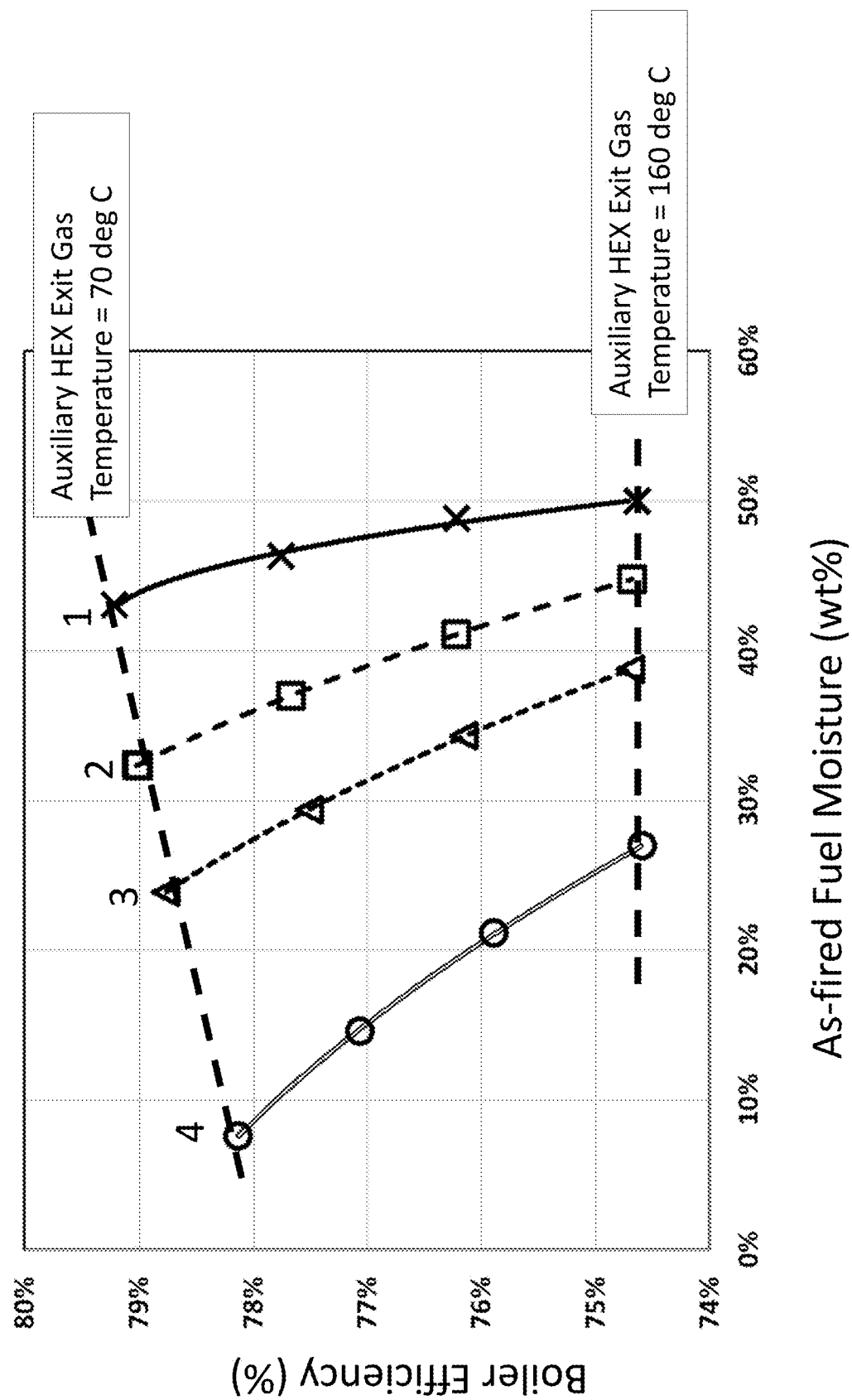
FIG. 12 is a graph showing boiler efficiency as a function of as-fired fuel moisture for Example 2.

FIG. 12 plots boiler efficiency as a function of as-fired moisture content for the dried solid fuel 38 for the four cases listed in Table 4. All results correspond to a baseline steam generation rate of 59,000 kg/hr as can be seen in Table 3. Each curve traces the efficiency for a given case as the temperature of the exhaust gas 36 leaving the auxiliary heat exchanger 190 decreases until it reaches the practical lower limit of 70° C. below which there is too much risk of condensation. As one travels up each curve it can be thought of as increasing the auxiliary heat exchanger area, which both increases the amount of heat delivered to the dryer 160 and reducing the as-fired fuel moisture and increases the boiler efficiency. Moving from Case 1 to Case 4 further increases the heat transferred to the dryer 160, reducing the as-fired fuel moisture. It should be noted that the model does not take into account unburned carbon which would decrease as as-fired fuel moisture decreases, improving efficiency. Lower as-fired fuel moisture also would improve efficiency by increasing temperature in the radiant section 120 of the boiler 115, which is also not accounted for in the model.

Figure 13:
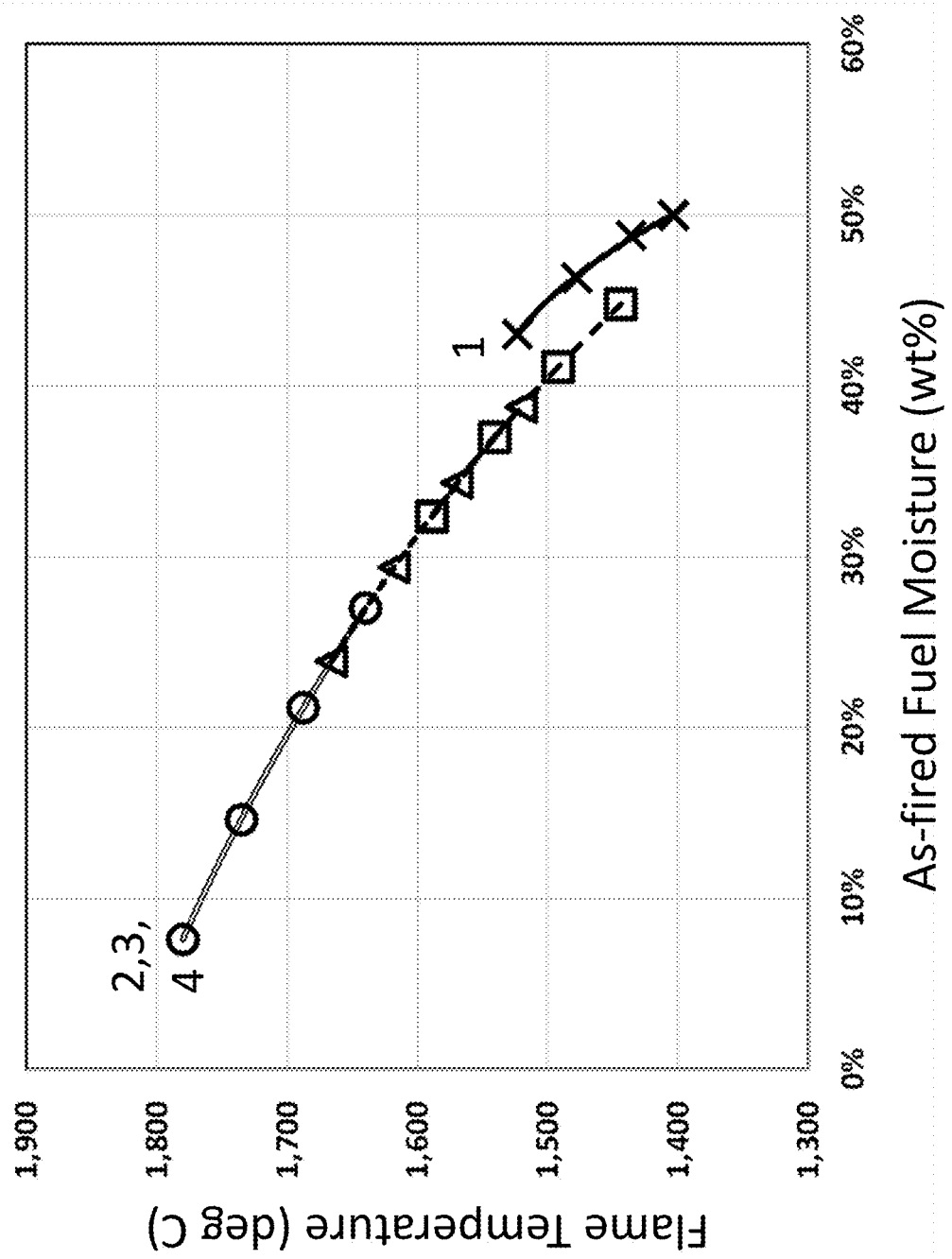
FIG. 13 is a graph showing flame temperature as a function of as-fired fuel moisture for Example 2.

FIG. 13 plots flame temperature versus as-fired fuel moisture for the same four cases. The dramatic increase in flame temperature with decreasing fuel moisture is beneficial for two distinct reasons. First, the higher temperatures increase the rate of radiation heat transfer from the flame to the boiler water tubes in the radiant section of the boiler, thus reducing the surface area required to raise the same amount of steam. Secondly, the higher flame temperature increases the rate of chemical reactions, minimizing unburned carbon losses. Note that the curves of Cases 2, 3 and 4 collapse to form a single temperature curve that is slightly lower than the curve of Case 1. This is because Case 1 is the only case where the combustion air stream 14 is preheated; all other cases utilize ambient temperature combustion air. Hence, flame temperature for Case 1 is moderately higher for a given as-fired fuel moisture level than the other 3 cases.

Figure 14:
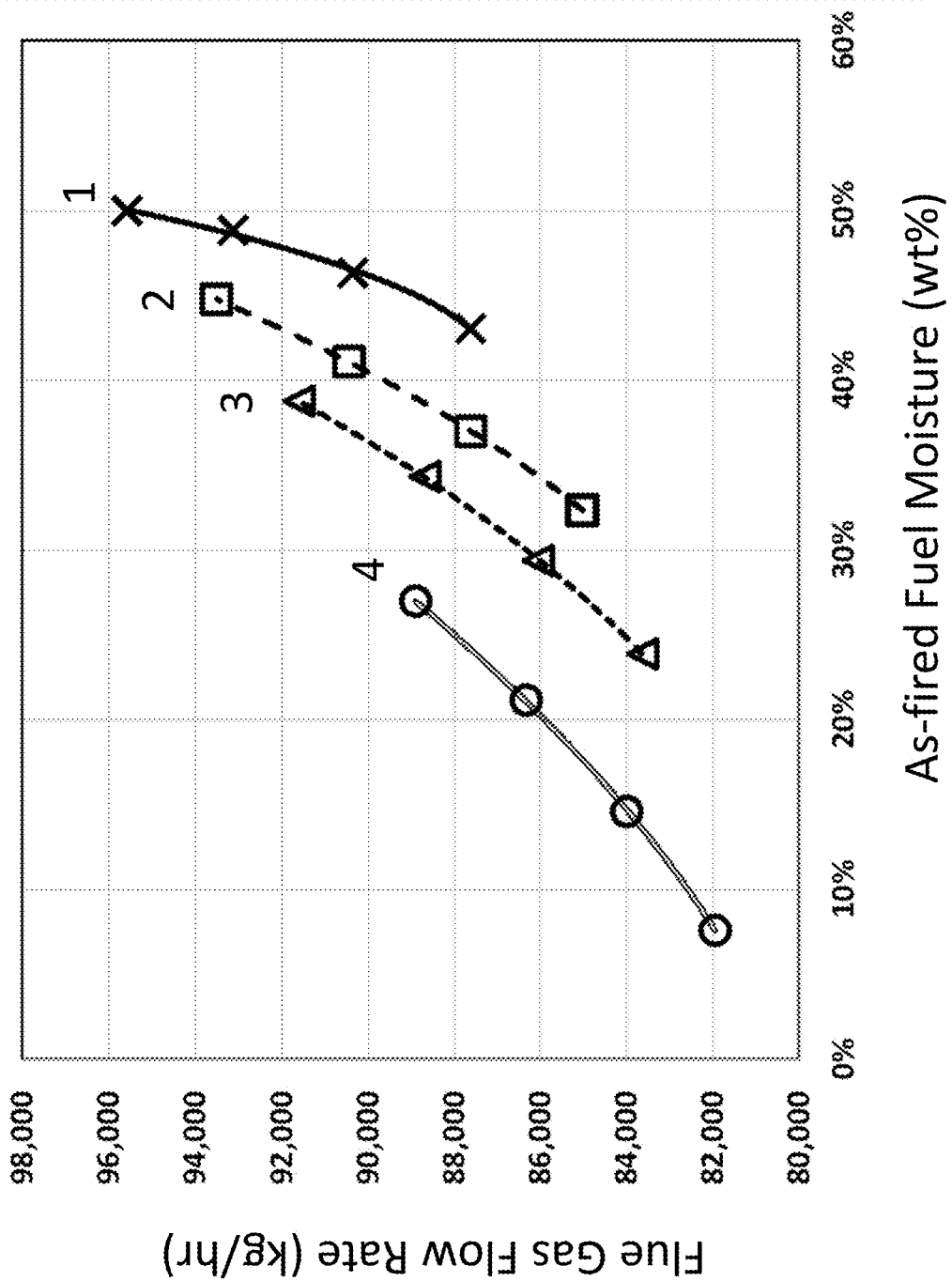
FIG. 14 is a graph showing flue gas flow rate as a function of as-fired fuel moisture for Example 2.

FIG. 14 plots flue gas flow rate versus as-fired moisture content, again for the same four cases. Note the sharp decrease in flue gas flow with decreasing fuel moisture. This large effect is due to two causes; one is the reduction in flue gas moisture content and the other is the simultaneous increase in boiler efficiency, which reduces the required fuel flow rate. As a boiler is optimally designed to handle a fixed flue gas volume due to constraints including heat exchangers, pressure drop, and pollution control equipment, this large reduction in flue gas volume can be leveraged in one of two ways. The first option would be to reduce the size of the boiler for a fixed steam generation rate, and the second would be to maintain the same boiler size and baseline flue gas flow rate while increasing fuel flow and/or thermal energy input to increase the steam generation rate.

Figure 15:
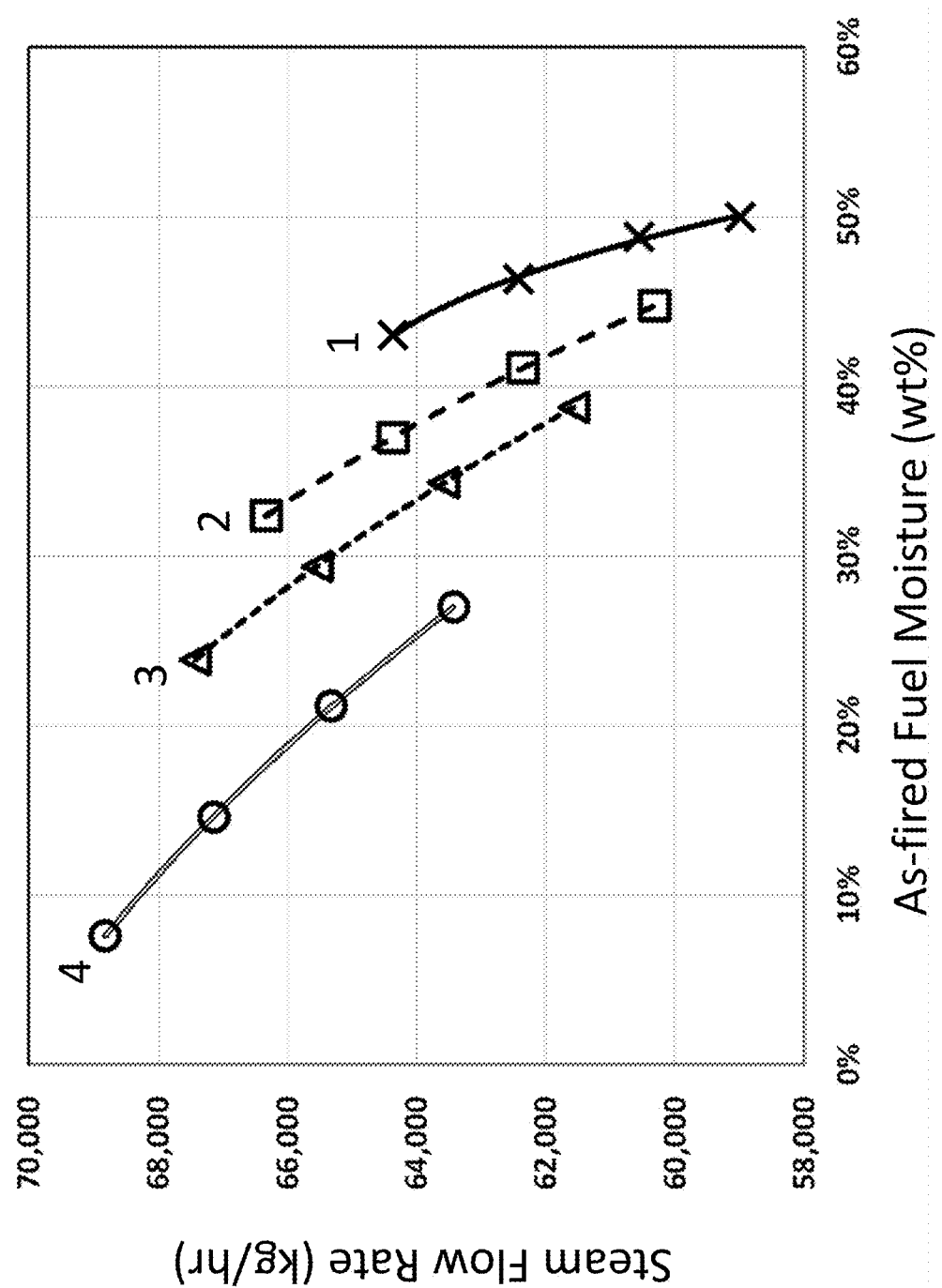
FIG. 15 is a graph showing steam flow rate as a function of as-fired fuel moisture for Example 2.

FIG. 15 illustrates the second option, in which for a given boiler size, the steam flow rate is plotted as a function of as-fired fuel moisture level. The increase in product steam as the degree of drying increases illustrates the value of the current invention, in which using heat energy to dry the high-moisture solid fuel instead using it to preheat the combustion air or to heat water in the economizer increases the steam production for a given boiler size. Case 4 being the best option is unexpected when as can be seen in FIG. 12, Case 1 results in the highest boiler efficiency, and as can be seen in FIG. 13, Case 1 traces a higher flame temperature for a given as-fired fuel moisture level.

Example 3

Figure 16:
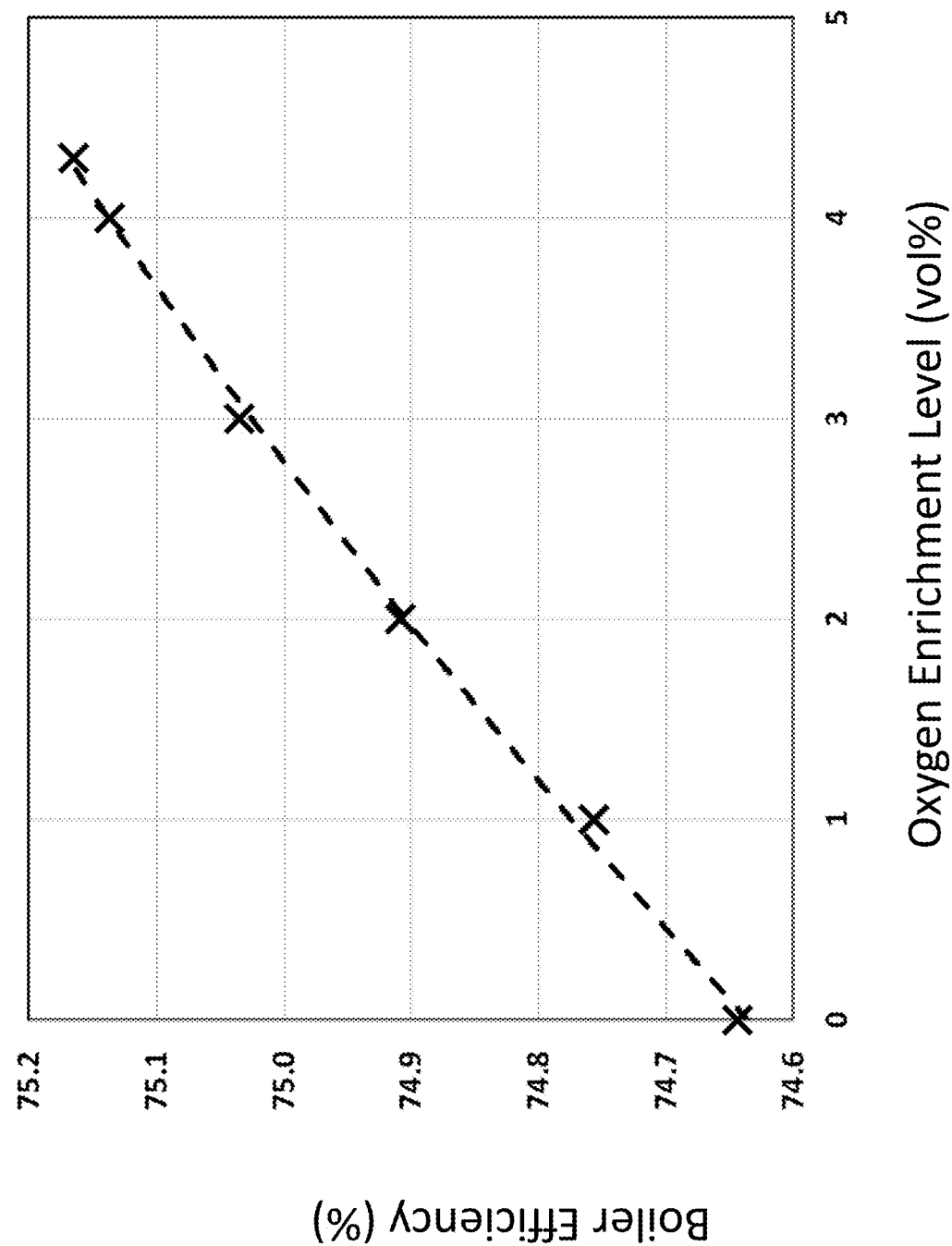
FIG. 16 is a graph showing boiler efficiency as a function of oxygen enrichment level for Example 3.

Introduction of oxygen into the combustion system further expands the boiler performance benefits highlighted in Example 2. Using oxygen-enriched combustion air while maintaining the same combustion equivalence ratio as in the baseline case leads to a higher flame temperature and faster chemical kinetic rates resulting in higher rates of radiant heat transfer and higher combustion efficiency with lower unburned carbon losses. Moreover, the reduction of nitrogen in the combustion air lowers the combustion products flow rate which, in turn, further augments the boiler's steam generation rate, as previously explained. As the unburned carbon losses are unaccounted for in the model, the improvement in boiler efficiency due to oxygen enrichment calculated by the model and plotted in FIG. 16 is solely a function of the reduced combustion products flow rate and is therefore under-predicted. Note that oxygen enrichment level is herein defined as the difference in volumetric (or molar) oxygen concentration of the mixture of combustion air stream 12, primary oxygen-enriched stream 52, and secondary oxygen-enriched stream 54 minus the ambient oxygen concentration of 20.9%. So, for example, an oxygen enrichment level of one percent corresponds to a mixed oxidizer concentration of nominally 21.9% by volume.

In principal, the oxygen concentration selected for the combustion system can be chosen independently of other equipment considerations within the overall systems described herein. However, in a preferred embodiment, the oxygen and nitrogen supplies for the system are produced by a single air separation unit. As such, the oxygen enrichment flow rate is coupled to the nitrogen flow rate used within the fuel dryer.

Figure 17:
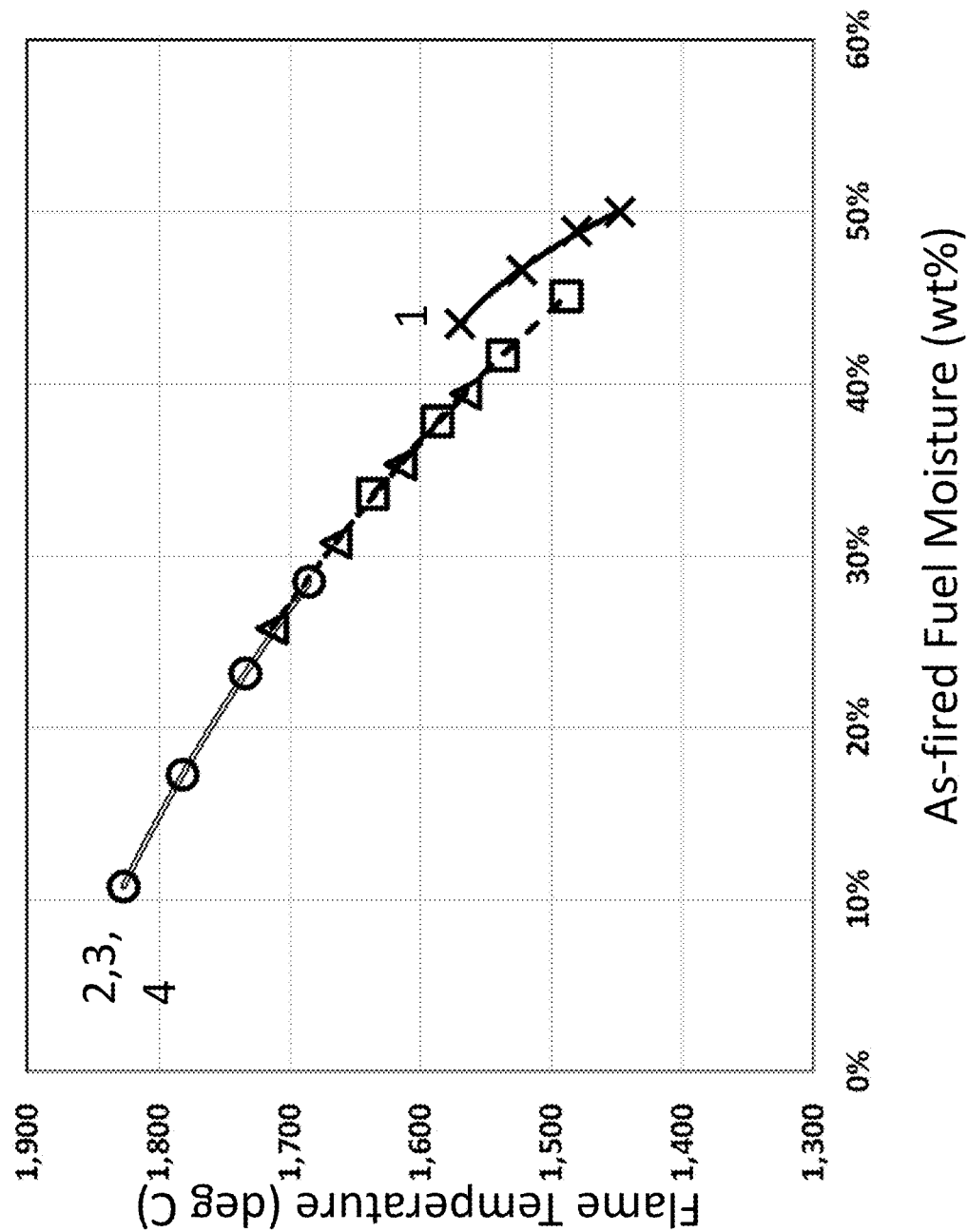
FIG. 17 is a graph showing flame temperature as a function of as-fired fuel moisture for Example 3.
Figure 18:
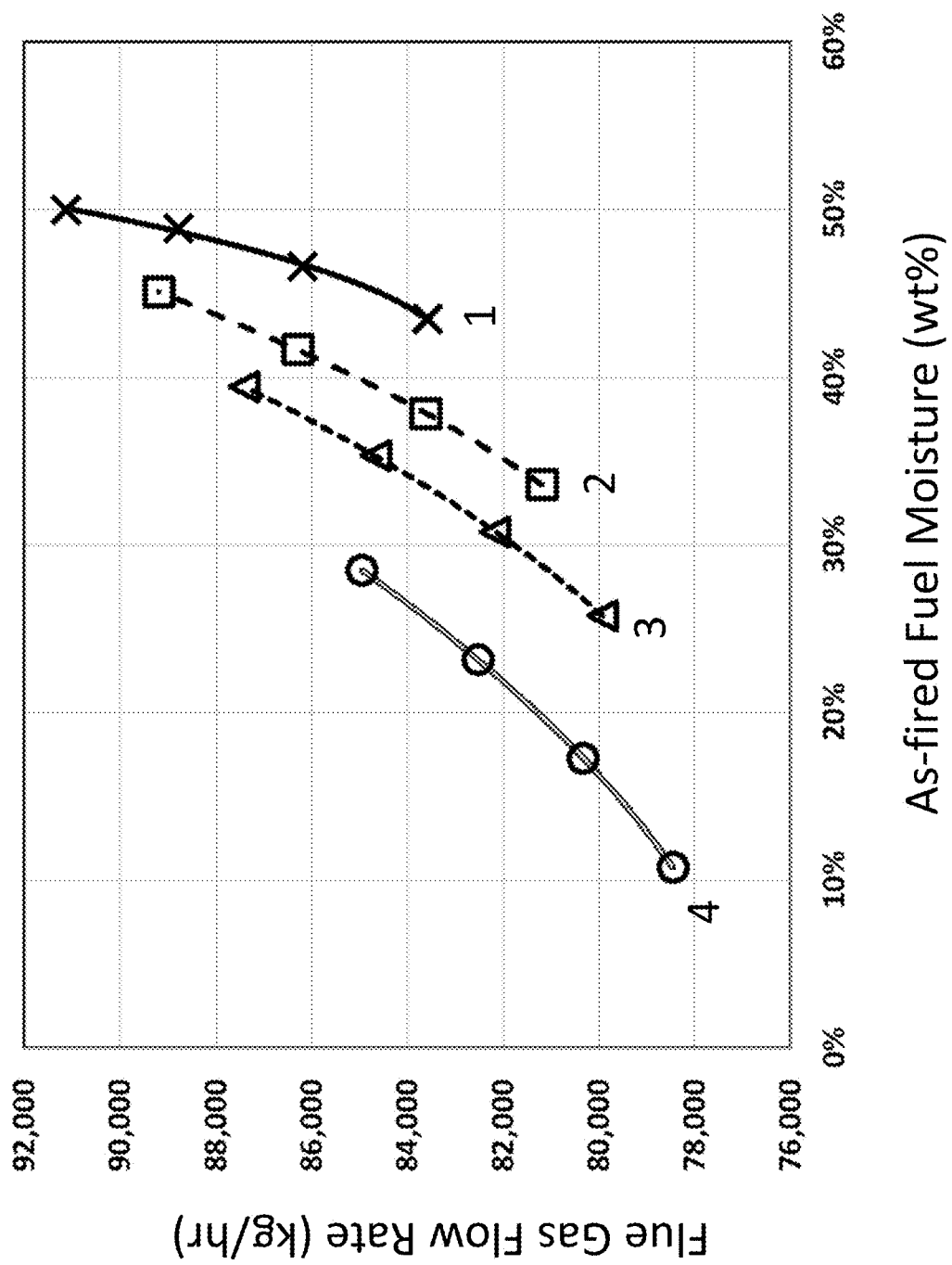
FIG. 18 is a graph showing flue gas flow rate as a function of as-fired fuel moisture for Example 3.
Figure 19:
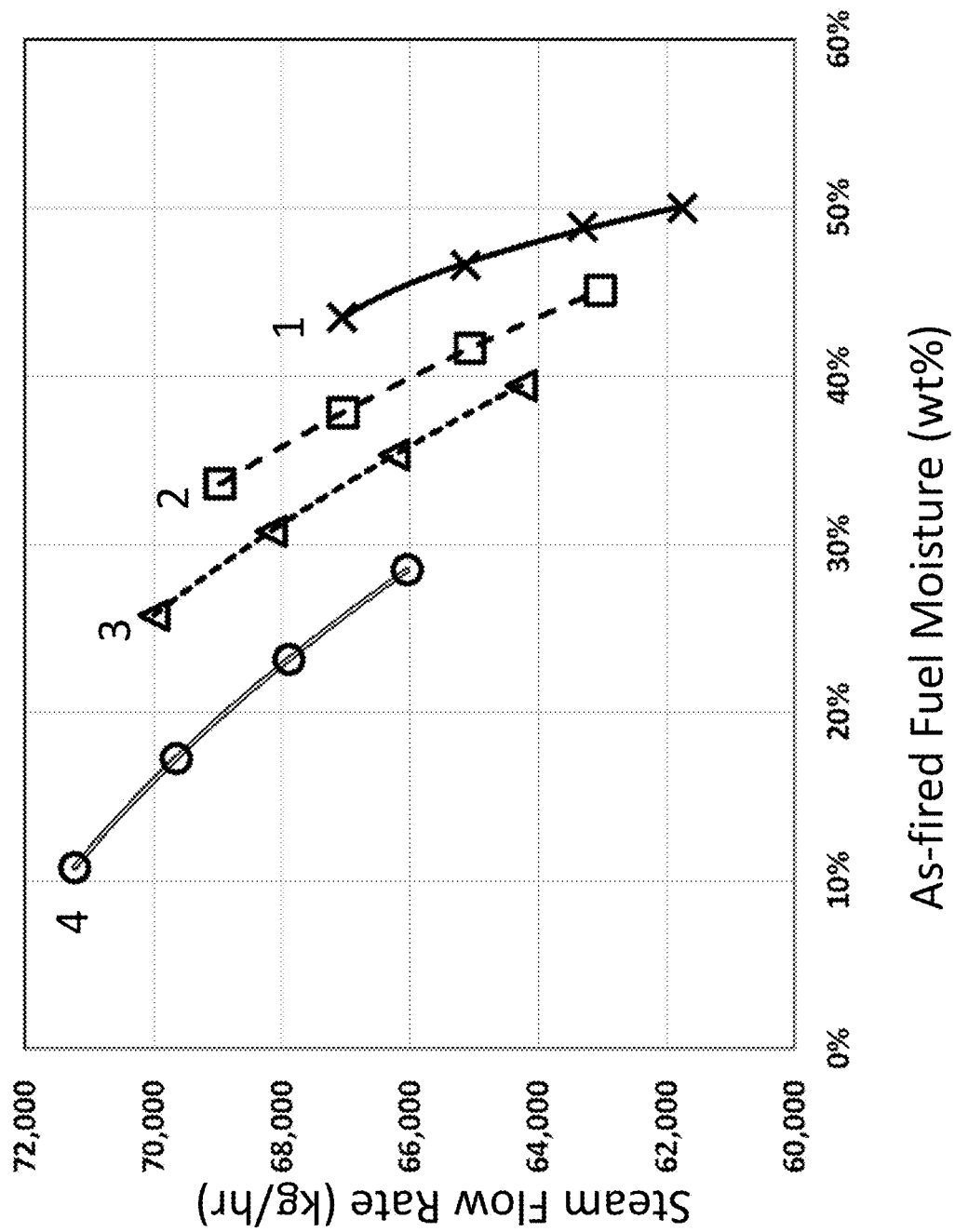
FIG. 19 is a graph showing steam flow rate as a function of as-fired fuel moisture for Example 3.

Example 3 assumes the same as-received coal properties as in Tables 1 and 2 and the analogous cases as in Example 2, and considers a dryer temperature of 95° C. and a maximum fuel moisture evaporation rate of 8500 kg/hr. From FIG. 10, the ratio of evaporated water to nitrogen is approximately 3.3. Hence, the nitrogen flow rate selected for the system is 8500/3.3~2575 kg/hr. Accordingly, the oxygen flow rate would typically be between about 770 to 1290 kg/hr, and the corresponding oxygen enrichment level of the air between about 1.0 to 1.5 vol %. Selecting an enrichment level of 1.3%, which is in this range, FIGS. 17, 18 and 19 summarize, respectively, the model predictions of flame temperature, flue gas flow rate and increased steam temperature vs as-fired fuel moisture. Comparing FIG. 17 with FIG. 13, the oxygen enrichment level of 1.3% increased the flame temperature by 50° C. beyond that attained with drying. In practice this would lead to an incremental increase in boiler radiant heat transfer and reduction in unburned carbon loss. Comparing FIG. 18 with FIG. 14 indicates an incremental reduction in flue gas volume of 4000-5000 kg/hr due to the oxygen enrichment at the baseline steam generation rate of 59,000 kg/hr. Finally, leveraging this reduced flue gas volume per unit of fuel flow to generate more steam, FIG. 19 reveals an incremental steam generation rate of nominally 2500 kg/hr higher than that produced without oxygen as shown in FIG. 15.

A final feature and benefit of the systems described herein is the ability to continuously adapt the system performance to variations in incoming fuel properties. For example, changes in as-received fuel moisture content or heating value may require adjustment to the degree of fuel drying. Or, a change in fuel ash properties may suggest the need to lower or increase the flame temperature. It will be readily appreciated based on the foregoing system description and analyses that optimal boiler operation in response to these and other changes in fuel properties are enabled by adjustment to the air heater bypass and/or oxygen enrichment level. To that end, proper system response to fuel property variations may require associated measurement instrumentation including one or more of the following performance parameters: fuel moisture level of the high-moisture solid fuel 10, fuel moisture level of the dried solid fuel 38, temperature of the boiler grate 110 (when the boiler is a stoker boiler), and temperature(s) of the combustion products stream 20, the first cooled combustion products stream 26, the second cooled combustion products stream 32, the third cooled combustion products stream 34, as well as steam temperature and steam pressure.

The output of one or more of these instruments may be connected in a control loop to automatically adjust the air heater air bypass damper position and/or the oxygen flow rate until a setpoint value is attained, similar to the control loops shown in the systems 103A and 104A.

While the principles of the invention have been described above in connection with preferred embodiments, it is to be clearly understood that this description is made only by way of example and not as a limitation of the scope of the invention.

I claim:

1. A process for combusting a high-moisture biomass fuel to generate steam, the process comprising:
   contacting a high-moisture solid biomass fuel with an oxygen-depleted gas stream while heating the high-moisture solid biomass fuel by indirect heat exchange with a recirculating thermal fluid to produce a dried solid fuel and a moist oxygen-depleted gas stream;
   combusting the dried solid fuel on a grate with a combustion air stream to produce a combustion products stream having an amount of heat;
   transferring a first portion of the amount of heat to generate steam by indirect heat exchange with the combustion products stream;
   transferring a second portion of the amount of heat to preheat the combustion air by indirect heat exchange with the combustion products stream;
   transferring a third portion of the amount of heat to the recirculating thermal fluid by indirect heat exchange with the combustion products stream;
   bypassing a portion of the combustion air stream to form a combustion air bypass stream; and
   transferring the combustion air bypass stream to a boiler;
   wherein at least a portion of the combustion air stream travels through the grate to combust the dried solid fuel.

2. The process of claim 1, wherein the high-moisture solid biomass fuel flows counter-current to the recirculating thermal fluid and co-current to the oxygen-depleted gas stream.

3. The process of claim 1, further comprising adding an oxygen-enriched stream to the combustion air stream prior to combusting the dried solid fuel; and
   controlling one or both of a flow rate of the oxygen-enriched stream and a location of adding the oxygen-enriched stream to control one or more of the following properties:
   steam temperature, steam pressure, steam drum level, stoker grate temperature, temperature of the combustion products stream prior to transferring the first portion of the amount of heat to generate steam, temperature of the combustion products stream after transferring the first portion of the amount of heat to generate steam, temperature of the combustion products stream after transferring the second portion of the amount of heat the preheat the combustion air, temperature of the combustion products stream after transferring the third portion of the amount of heat to the recirculating thermal fluid, temperature of the moist oxygen-depleted gas stream, temperature of the dried solid fuel, moisture level of the high-moisture solid fuel, and moisture level of the dried solid fuel.

4. The process of claim 3, wherein the oxygen-enriched stream and the oxygen-depleted stream are both produced by the same air separation unit.

5. The process of claim 1,
   wherein when bypassing a portion of the combustion air stream, increasing or decreasing the amount of the portion of the combustion air stream bypassing indirect heat exchange with the combustion products stream to control one or more of the following properties: temperature of the combustion products stream prior to transferring the second portion of the amount of heat to the recirculating thermal fluid, temperature of the combustion products stream after transferring the second portion of the amount of heat to the recirculating thermal fluid, moisture content of the dried solid fuel, or moisture content of the oxygen-depleted gas stream after contacting with the high-moisture solid fuel.

* * * * *